(12) United States Patent
Huang et al.

(10) Patent No.: US 11,445,483 B2
(45) Date of Patent: Sep. 13, 2022

(54) UPLINK CONTROL CHANNEL RESOURCE DEFINITION AND MAPPING TO USER EQUIPMENT

(71) Applicant: QUALCOMM Incorporated, San Diego, CA (US)

(72) Inventors: Yi Huang, San Diego, CA (US); Juan Montojo, San Diego, CA (US); Peter Gaal, San Diego, CA (US); Wanshi Chen, San Diego, CA (US); Tao Luo, San Diego, CA (US); Seyong Park, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/049,082

(22) Filed: Jul. 30, 2018

(65) Prior Publication Data

US 2019/0045499 A1 Feb. 7, 2019

Related U.S. Application Data

(60) Provisional application No. 62/539,973, filed on Aug. 1, 2017.

(51) Int. Cl.
*H04J 3/00* (2006.01)
*H04W 72/04* (2009.01)
(Continued)

(52) U.S. Cl.
CPC ....... *H04W 72/0413* (2013.01); *H04L 5/0053* (2013.01); *H04W 72/0446* (2013.01); *H04L 5/0044* (2013.01); *H04L 5/14* (2013.01)

(58) Field of Classification Search
None
See application file for complete search history.

(56) References Cited

U.S. PATENT DOCUMENTS 9,313,801 B2 * 4/2016 Hooli ................ H04W 72/1278
9,820,247 B2 * 11/2017 Xiong ..................... H04W 4/70
(Continued)

FOREIGN PATENT DOCUMENTS

CN 105187172 A 12/2015
CN 105743627 A 7/2016

OTHER PUBLICATIONS

CATT: "Design of Multi-Slot PUCCH Transmission", 3GPP Draft; R1-1710087, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27, 2017-Jun. 30, 2017 Jun. 26, 2017, XP051299311, Retrieved from the Internet: URL:http://www.3gpp.org/ftp/Meetings_3GPP_SYNC/RAN1/Docs/ [retrieved on Jun. 26, 2017], 3 pages.

(Continued)

*Primary Examiner* — Gerald A Smarth
(74) *Attorney, Agent, or Firm* — Holland & Hart LLP

(57) ABSTRACT

Methods, systems, and devices for wireless communication are described for defining uplink control channel resources and mapping uplink control channel resources to a user equipment (UE). Approaches described herein include identifying a physical uplink control channel (PUCCH) format to be used for a subsequent PUCCH transmission by the UE, identifying a PUCCH resource mapping rule based at least in part on the PUCCH format, and determining an uplink transmission resource to be used for the subsequent PUCCH transmission based at least in part on the PUCCH resource mapping rule. The PUCCH resource mapping rule may be explicit and/or implicit.

50 Claims, 18 Drawing Sheets

(51) Int. Cl.
*H04L 5/00* (2006.01)
*H04L 5/14* (2006.01)

(56) References Cited

U.S. PATENT DOCUMENTS

| | | | | |
|---|---|---|---|---|
| 10,039,087 | B2* | 7/2018 | Nayeb Nazar | H04B 1/7097 |
| 2011/0243066 | A1* | 10/2011 | Nayeb Nazar | H04L 1/1671 |
| | | | | 370/328 |
| 2013/0070689 | A1* | 3/2013 | Liu | H04L 5/0035 |
| | | | | 370/329 |
| 2013/0208691 | A1* | 8/2013 | Yang | H04L 1/0029 |
| | | | | 370/329 |
| 2014/0050191 | A1* | 2/2014 | Kim | H04L 5/0053 |
| | | | | 370/329 |
| 2014/0050192 | A1* | 2/2014 | Kim | H04L 5/001 |
| | | | | 370/329 |
| 2014/0133411 | A1* | 5/2014 | Park | H04L 5/0053 |
| | | | | 370/329 |
| 2014/0362792 | A1 | 12/2014 | Cheng et al. | |
| 2015/0358137 | A1* | 12/2015 | Chae | H04L 1/1854 |
| | | | | 370/329 |
| 2017/0013563 | A1* | 1/2017 | Yang | H04W 52/346 |
| 2017/0033908 | A1* | 2/2017 | Hwang | H04L 5/0053 |
| 2017/0142692 | A1 | 5/2017 | Kim et al. | |
| 2017/0332386 | A1* | 11/2017 | Li | H04L 1/1812 |
| 2017/0366311 | A1* | 12/2017 | Iyer | H04B 7/0482 |
| 2017/0374679 | A1* | 12/2017 | Park | H04L 5/0044 |
| 2018/0076942 | A1* | 3/2018 | Nory | H04L 5/0055 |
| 2018/0097607 | A1* | 4/2018 | Ji | H04L 5/14 |
| 2018/0176909 | A1* | 6/2018 | Wikstrom | H04W 72/042 |
| 2018/0220415 | A1* | 8/2018 | Yin | H04L 5/0053 |

OTHER PUBLICATIONS

Guangdong Oppo Mobile Telecom: "Slot Aggregation and Configuration for NR long PUCCH", 3GPP Draft; R1-1710159, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27, 2017-Jun. 30, 2017 Jun. 16, 2017, XP051304238, Retrieved from the Internet: URL:http://www.3gpp.org/ftp/tsg_ran/WG1_RL1/TSGR1_AH/NR_AH_1706/Docs/ [retrieved on—Jun. 16, 2017], 5 pages.
Guangdong Oppo Mobile Telecom: "On Duration Aspects of NR PUCCH with long Duration", 3GPP Draft; R1-1701956, 3rd Generation Partnership Project (3GPP), Mobile Competence Centre, 650, Route Des Lucioles, F-06921 Sophia-Antipolis Cedex, France, vol. RAN WG1, No. Athens, Greece; Feb. 13, 2017-Feb. 17, 2017 Feb. 7, 2017, XP051220927, Retrieved from the Internet: URL:http://www.3gpp.org/ftp/tsg_ran/WG1_RL1/TSGR1_88/Docs/ [retrieved on Feb. 7, 2017], 5 pages.
International Search Report and Written Opinion—PCT/US2018/044557—ISA/EPO—dated Feb. 5, 2019.
Qualcomm Incorporated: "Resource Allocation and Transmit Diversity for PUCCH", 3GPP Draft, R1-1716426 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 21, 2017-Aug. 25, 2017, Sep. 17, 2017 (Sep. 17, 2017), XP051339881, pp. 1-14.
Samsung: "Resource Allocation for PUCCH with HARQ-ACK", 3GPP Draft; R1-1710709, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27, 2017-Jun. 30, 2017 Jun. 26, 2017, XP051299915, Retrieved from the Internet: URL:http://www.3gpp.org/ftp/Meetings_3GPP_SYNC/RAN1/Docs/ [retrieved on Jun. 26, 2017], 4 pages.
Taiwan Search Report—TW107126462—TIPO—dated Aug. 16, 2021.
Samsung: "Resource Allocation for PUCCH", 3GPP TSG RAN WG1 Meeting #88bis, R1-1705392, Spokane, USA, Mar. 3-7, 2017, pp. 1-4.
Intel Corporation: "Time and Frequency Domain Resource Allocation for Long PUCCH", 3GPP TSG RAN WG1 Meeting #89, R1-1707396, Hangzhou, P. R. China, May 15-19, 2017, 5 Pages.

* cited by examiner

UPLINK CONTROL CHANNEL RESOURCE DEFINITION AND MAPPING TO USER EQUIPMENT

CROSS REFERENCES

The present Application for Patent claims the benefit of U.S. Provisional Patent Application No. 62/539,973 by HUANG, et al., entitled "Uplink Control Channel Resource Definition and Mapping To User Equipment," filed Aug. 1, 2017, assigned to the assignee hereof, and expressly incorporated by reference herein in its entirety.

BACKGROUND

The following relates generally to wireless communication, and more specifically to defining and mapping resources for transmitting uplink control information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communication systems, a UE may transmit uplink control information (UCI) to a base station. The UCI may be transmitted to the base station via a physical uplink control channel (PUCCH) using various transmission resources. However, in some 5G or NR systems, the PUCCH duration may vary. Indeed, the PUCCH resources to be used by a UE may vary from slot-to-slot (or transmission time interval (TTI)-to-TTI). Methods to indicate the PUCCH resources to the UE, or to allow the UE to determine the PUCCH resources, are desired.

SUMMARY

The described techniques relate to improved methods, systems, devices, or apparatuses that support uplink control channel resource definition and mapping to user equipment. In some wireless communication systems, a UE may transmit uplink control information (UCI) to a base station via a physical uplink control channel (PUCCH). The UE and the base station may determine which transmission resources the UE will use for a subsequent PUCCH transmission and when the UE will use those transmission resources. Methods may be used to facilitate consistency between the base station's determination and the UE's determination regarding which transmission resources the UE is to use for a subsequent PUCCH transmission and the transmission time intervals (TTIs) during which the UE is to use those transmission resources. The base station and the UE each may use one or more PUCCH resource definitions, one or more PUCCH resource mapping rules, and TTI mapping rules to ensure the consistency of these determinations. The PUCCH resource mapping rules and TTI mapping rules may be explicit or implicit.

The choice of PUCCH resource mapping rule used by either the base station or the UE may depend at least in part on the format of a subsequent PUCCH transmission. For example, the choice of PUCCH resource mapping rule may depend at least in part on a set or pool of PUCCH resources that includes PUCCH resources having the format of the subsequent PUCCH transmission, including on whether a number of bits that may be explicitly indicated by the base station (e.g., in a downlink control information (DCI) transmitted to the UE) is sufficient to uniquely identify the PUCCH resources in the corresponding set or pool of PUCCH resources. Use of these aspects of the present disclosure, alone or in combination, may enable the UE and the base station to consistently determine the same PUCCH resources and TTIs to be used for a subsequent PUCCH transmission by the UE while minimizing the number of transmitted symbols related to such determinations, thereby saving system resources such as power, frequency, time, and spectrum resources.

A method of wireless communication is described. The method may include identifying a PUCCH format to be used for a subsequent PUCCH transmission, identifying a PUCCH resource mapping rule based at least in part on the PUCCH format, determining an uplink transmission resource to be used for the subsequent PUCCH transmission based at least in part on the PUCCH resource mapping rule, and transmitting a signal indicative of the uplink transmission resource.

An apparatus for wireless communication is described. The apparatus may include means for identifying a PUCCH format to be used for a subsequent PUCCH transmission, means for identifying a PUCCH resource mapping rule based at least in part on the PUCCH format, means for determining an uplink transmission resource to be used for the subsequent PUCCH transmission based at least in part on the PUCCH resource mapping rule, and means for transmitting a signal indicative of the uplink transmission resource.

Another apparatus for wireless communication is described. The apparatus may include a processor, memory in electronic communication with the processor, and instructions stored in the memory. The instructions may be operable to cause the processor to identify a PUCCH format to be used for a subsequent PUCCH transmission, identify a PUCCH resource mapping rule based at least in part on the PUCCH format, determine an uplink transmission resource to be used for the subsequent PUCCH transmission based at least in part on the PUCCH resource mapping rule, and transmit a signal indicative of the uplink transmission resource.

A non-transitory computer readable medium for wireless communication is described. The non-transitory computer-readable medium may include instructions operable to cause a processor to identify a PUCCH format to be used for a subsequent PUCCH transmission, identify a PUCCH resource mapping rule based at least in part on the PUCCH format, determine an uplink transmission resource to be used for the subsequent PUCCH transmission based at least in part on the PUCCH resource mapping rule, and transmit a signal indicative of the uplink transmission resource.

Some examples of the method, apparatus, and non-transitory computer-readable medium described above may further include processes, features, means, or instructions for including in the signal indicative of the uplink transmission resource an explicit indication of the uplink transmission resource to be used for the subsequent PUCCH transmission. In some examples of the method, apparatus, and non-transitory computer-readable medium described above, the explicit indication of the uplink transmission resource to be used for the subsequent PUCCH transmission may comprise an index representative of the uplink transmission resource.

In some examples of the method, apparatus, and non-transitory computer-readable medium described above, identifying the PUCCH format to be used for the subsequent PUCCH transmission may comprise identifying an amount of uplink control data to be included in the subsequent PUCCH transmission. In some examples of the method, apparatus, and non-transitory computer-readable medium described above, identifying the PUCCH resource mapping rule based at least in part on the PUCCH format may include identifying an implicit resource mapping rule if the amount of uplink control data to be included in the subsequent PUCCH transmission is below a threshold amount. In some examples of the method, apparatus, and non-transitory computer-readable medium described above, identifying the implicit resource mapping rule if the amount of uplink control data to be included in the subsequent PUCCH transmission is less than or equal to a threshold amount may further include identifying a first set of uplink transmission resources based at least in part on the amount of uplink control data being less than or equal to the threshold amount, where the first set includes uplink transmission resources having a PUCCH format compatible with the amount of uplink control data being less than or equal to the threshold amount, identifying a number of uplink transmission resources included in the first set, and identifying the implicit resource mapping rule if the number of uplink transmission resources included in the first set is above a threshold number of uplink transmission resources. In some examples of the method, apparatus, and non-transitory computer-readable medium described above, the threshold number of uplink transmission resources may include a maximum number of uplink transmission resources that may be uniquely identified in a downlink control information (DCI) field.

In some examples of the method, apparatus, and non-transitory computer-readable medium described above, identifying the PUCCH resource mapping rule based at least in part on the PUCCH format may include identifying the explicit resource mapping rule if the amount of uplink control data to be included in the subsequent PUCCH transmission is above a threshold amount. In some examples of the method, apparatus, and non-transitory computer-readable medium described above, identifying an explicit resource mapping rule if the amount of uplink control data to be included in the subsequent PUCCH transmission is above a threshold amount may include identifying a second set of uplink transmission resources based at least in part on the amount of uplink control data being above the threshold amount, where the second set includes uplink transmission resources having a PUCCH format compatible with the amount of uplink control data being above the threshold amount; identifying a number of uplink transmission resources included in the second set; and identifying the explicit resource mapping rule if the number of uplink transmission resources included in the second set is less than or equal to a threshold number of uplink transmission resources. In some examples of the method, apparatus, and non-transitory computer-readable medium described above, the threshold number of uplink transmission resources may include a maximum number of uplink transmission resources that may be uniquely identified in a downlink control information (DCI) field.

In some examples of the method, apparatus, and non-transitory computer-readable medium described above, identifying the PUCCH format to be used for the subsequent PUCCH transmission may include identifying the type of uplink control information to be included in the subsequent PUCCH transmission. In some examples of the method, apparatus, and non-transitory computer-readable medium described above, identifying the PUCCH format to be used for the subsequent PUCCH transmission may include determining whether the PUCCH format is a short PUCCH format or a long PUCCH format.

In some examples of the method, apparatus, and non-transitory computer-readable medium described above, the uplink transmission resource to be used for the subsequent PUCCH transmission may include one or more of a starting symbol, a symbol range within an uplink transmission time interval, one or more resource blocks, a cyclic shift, or an orthogonal cover code.

Some examples of the method, apparatus, and non-transitory computer-readable medium described above may further include processes, features, means, or instructions for identifying a TTI mapping rule based at least in part on the PUCCH resource mapping rule, determining a TTI in which the uplink transmission resource is to be used for the subsequent PUCCH transmission based at least in part on the TTI mapping rule, and transmitting a signal indicative of the TTI. Some examples of the method, apparatus, and non-transitory computer-readable medium described above may further include processes, features, means, or instructions for including in the signal indicative of the TTI an explicit indication of the TTI. In some examples of the method, apparatus, and non-transitory computer-readable medium described above, the explicit indication of the TTI may include an index representative of an offset relative to a current TTI used for a current PUCCH transmission.

In some examples of the method, apparatus, and non-transitory computer-readable medium described above, identifying the TTI mapping rule based at least in part on the PUCCH resource mapping rule may include identifying an implicit TTI mapping rule if the PUCCH resource mapping rule is an implicit PUCCH resource mapping rule. In some examples of the method, apparatus, and non-transitory computer-readable medium described above, the implicit TTI mapping rule may include applying an offset relative to a current TTI used for a current PUCCH transmission.

In some examples of the method, apparatus, and non-transitory computer-readable medium described above, identifying the TTI mapping rule based at least in part on the PUCCH resource mapping rule may include identifying an explicit TTI mapping rule if the PUCCH resource mapping rule is an explicit PUCCH resource mapping rule. In some examples of the method, apparatus, and non-transitory computer-readable medium described above, identifying the TTI mapping rule based at least in part on the PUCCH resource mapping rule may include identifying an implicit uplink transmission time interval mapping rule if the PUCCH resource mapping rule is an explicit PUCCH resource mapping rule. In some examples of the method, apparatus, and non-transitory computer-readable medium described above, identifying the TTI mapping rule based at least in part on the PUCCH resource mapping rule may include identifying an explicit TTI mapping rule if the PUCCH resource mapping rule is an implicit PUCCH resource mapping rule.

In some examples of the method, apparatus, and non-transitory computer-readable medium described above, the uplink transmission resource comprises resources within more than one TTI. In some examples of the method, apparatus, and non-transitory computer-readable medium described above, the uplink transmission resource may include more than one set of resources within one TTI.

A method of wireless communication is described. The method may include identifying a PUCCH format to be used for a subsequent PUCCH transmission, identifying a PUCCH resource mapping rule based at least in part on the PUCCH format, receiving a signal indicative of an uplink transmission resource to be used for the subsequent PUCCH transmission, determining the uplink transmission resource to be used for the subsequent PUCCH transmission based at least in part on the PUCCH resource mapping rule, and transmitting the subsequent PUCCH transmission via the uplink transmission resource.

An apparatus for wireless communication is described. The apparatus may include means for identifying a PUCCH format to be used for a subsequent PUCCH transmission, means for identifying a PUCCH resource mapping rule based at least in part on the PUCCH format, means for receiving a signal indicative of an uplink transmission resource to be used for the subsequent PUCCH transmission, means for determining the uplink transmission resource to be used for the subsequent PUCCH transmission based at least in part on the PUCCH resource mapping rule, and means for transmitting the subsequent PUCCH transmission via the uplink transmission resource.

Another apparatus for wireless communication is described. The apparatus may include a processor, memory in electronic communication with the processor, and instructions stored in the memory. The instructions may be operable to cause the processor to identify a PUCCH format to be used for a subsequent PUCCH transmission, identify a PUCCH resource mapping rule based at least in part on the PUCCH format, receive a signal indicative of an uplink transmission resource to be used for the subsequent PUCCH transmission, determine the uplink transmission resource to be used for the subsequent PUCCH transmission based at least in part on the PUCCH resource mapping rule, and transmit the subsequent PUCCH transmission via the uplink transmission resource.

A non-transitory computer readable medium for wireless communication is described. The non-transitory computer-readable medium may include instructions operable to cause a processor to identify a PUCCH format to be used for a subsequent PUCCH transmission, identify a PUCCH resource mapping rule based at least in part on the PUCCH format, receive a signal indicative of an uplink transmission resource to be used for the subsequent PUCCH transmission, determine the uplink transmission resource to be used for the subsequent PUCCH transmission based at least in part on the PUCCH resource mapping rule, and transmit the subsequent PUCCH transmission via the uplink transmission resource.

Some examples of the method, apparatus, and non-transitory computer-readable medium described above may further include processes, features, means, or instructions for receiving within the signal indicative of the uplink transmission resource an explicit indication of the uplink transmission resource to be used for the subsequent PUCCH transmission. In some examples of the method, apparatus, and non-transitory computer-readable medium described above, the explicit indication of the uplink transmission resource to be used for the subsequent PUCCH transmission may include an index representative of the uplink transmission resource.

In some examples of the method, apparatus, and non-transitory computer-readable medium described above, identifying the PUCCH format to be used for the subsequent PUCCH transmission may include identifying an amount of uplink control data to be included in the subsequent PUCCH transmission. In some examples of the method, apparatus, and non-transitory computer-readable medium described above, identifying the PUCCH resource mapping rule based at least in part on the PUCCH format may include identifying an implicit resource mapping rule if the amount of uplink control data to be included in the subsequent PUCCH transmission is below a threshold amount. In some examples of the method, apparatus, and non-transitory computer-readable medium described above, identifying the implicit resource mapping rule if the amount of uplink control data to be included in the subsequent PUCCH transmission is less than or equal to a threshold amount may further include identifying a first set of uplink transmission resources based at least in part on the amount of uplink control data being less than or equal to the threshold amount, where the first set includes uplink transmission resources having a PUCCH format compatible with the amount of uplink control data being less than or equal to the threshold amount; identifying a number of uplink transmission resources included in the first set; and identifying the implicit resource mapping rule if the number of uplink transmission resources included in the first set is above a threshold number of uplink transmission resources. In some examples of the method, apparatus, and non-transitory computer-readable medium described above, the threshold number of uplink transmission resources may include a maximum number of uplink transmission resources that may be uniquely identified in a downlink control information (DCI) field.

In some examples of the method, apparatus, and non-transitory computer-readable medium described above, identifying the PUCCH resource mapping rule based at least in part on the PUCCH format may include identifying the explicit resource mapping rule if the amount of uplink control data to be included in the subsequent PUCCH transmission is above a threshold amount. In some examples of the method, apparatus, and non-transitory computer-readable medium described above, identifying an explicit resource mapping rule if the amount of uplink control data to be included in the subsequent PUCCH transmission is above a threshold amount may include identifying a second set of uplink transmission resources based at least in part on the amount of uplink control data being above the threshold amount, where the second set includes uplink transmission resources having a PUCCH format compatible with the amount of uplink control data being above the threshold amount, identifying a number of uplink transmission resources included in the second set, and identifying the explicit resource mapping rule if the number of uplink transmission resources included in the second set is less than or equal to a threshold number of uplink transmission resources. In some examples of the method, apparatus, and non-transitory computer-readable medium described above, the threshold number of uplink transmission resources may include a maximum number of uplink transmission resources that may be uniquely identified in a downlink control information (DCI) field.

In some examples of the method, apparatus, and non-transitory computer-readable medium described above, identifying the PUCCH format to be used for the subsequent PUCCH transmission may include identifying the type of uplink control information to be included in the subsequent PUCCH transmission. In some examples of the method, apparatus, and non-transitory computer-readable medium described above, identifying the PUCCH format to be used for the subsequent PUCCH transmission may include determining whether the PUCCH format is a short PUCCH format or a long PUCCH format.

In some examples of the method, apparatus, and non-transitory computer-readable medium described above, the uplink transmission resource to be used for the subsequent PUCCH transmission may include one or more of a starting symbol, a symbol range within an uplink transmission time interval, one or more resource blocks, a cyclic shift, or an orthogonal cover code.

Some examples of the method, apparatus, and non-transitory computer-readable medium described above may further include processes, features, means, or instructions for identifying a TTI mapping rule based at least in part on the PUCCH resource mapping rule, determining a TTI in which a TTI in which the uplink transmission resource is to be used for the subsequent PUCCH transmission based at least in part on the TTI mapping rule, and transmitting the subsequent PUCCH transmission within the TTI. Some examples of the method, apparatus, and non-transitory computer-readable medium described above may further include processes, features, means, or instructions for receiving an explicit indication of the TTI. In some examples of the method, apparatus, and non-transitory computer-readable medium described above, the explicit indication of the TTI may include an index representative of an offset relative to a current TTI used for a current PUCCH transmission.

In some examples of the method, apparatus, and non-transitory computer-readable medium described above, identifying the TTI mapping rule based at least in part on the PUCCH resource mapping rule may include identifying an implicit TTI mapping rule if the PUCCH resource mapping rule is an implicit PUCCH resource mapping rule. In some examples of the method, apparatus, and non-transitory computer-readable medium described above, the implicit TTI mapping rule may include applying an offset relative to a current TTI used for a current PUCCH transmission.

In some examples of the method, apparatus, and non-transitory computer-readable medium described above, identifying the TTI mapping rule based at least in part on the PUCCH resource mapping rule may include identifying an explicit TTI mapping rule if the PUCCH resource mapping rule is an explicit PUCCH resource mapping rule. In some examples of the method, apparatus, and non-transitory computer-readable medium described above, identifying the TTI mapping rule based at least in part on the PUCCH resource mapping rule may include identifying an explicit TTI mapping rule if the PUCCH resource mapping rule is an implicit PUCCH resource mapping rule. In some examples of the method, apparatus, and non-transitory computer-readable medium described above, identifying the TTI mapping rule based at least in part on the PUCCH resource mapping rule may include identifying an implicit TTI mapping rule if the PUCCH resource mapping rule is an explicit PUCCH resource mapping rule.

In some examples of the method, apparatus, and non-transitory computer-readable medium described above, the uplink transmission resource may include resources within more than one TTI. In some examples of the method, apparatus, and non-transitory computer-readable medium described above, the uplink transmission resource may include more than one set of resources within one TTI.

DETAILED DESCRIPTION

Figure 1:
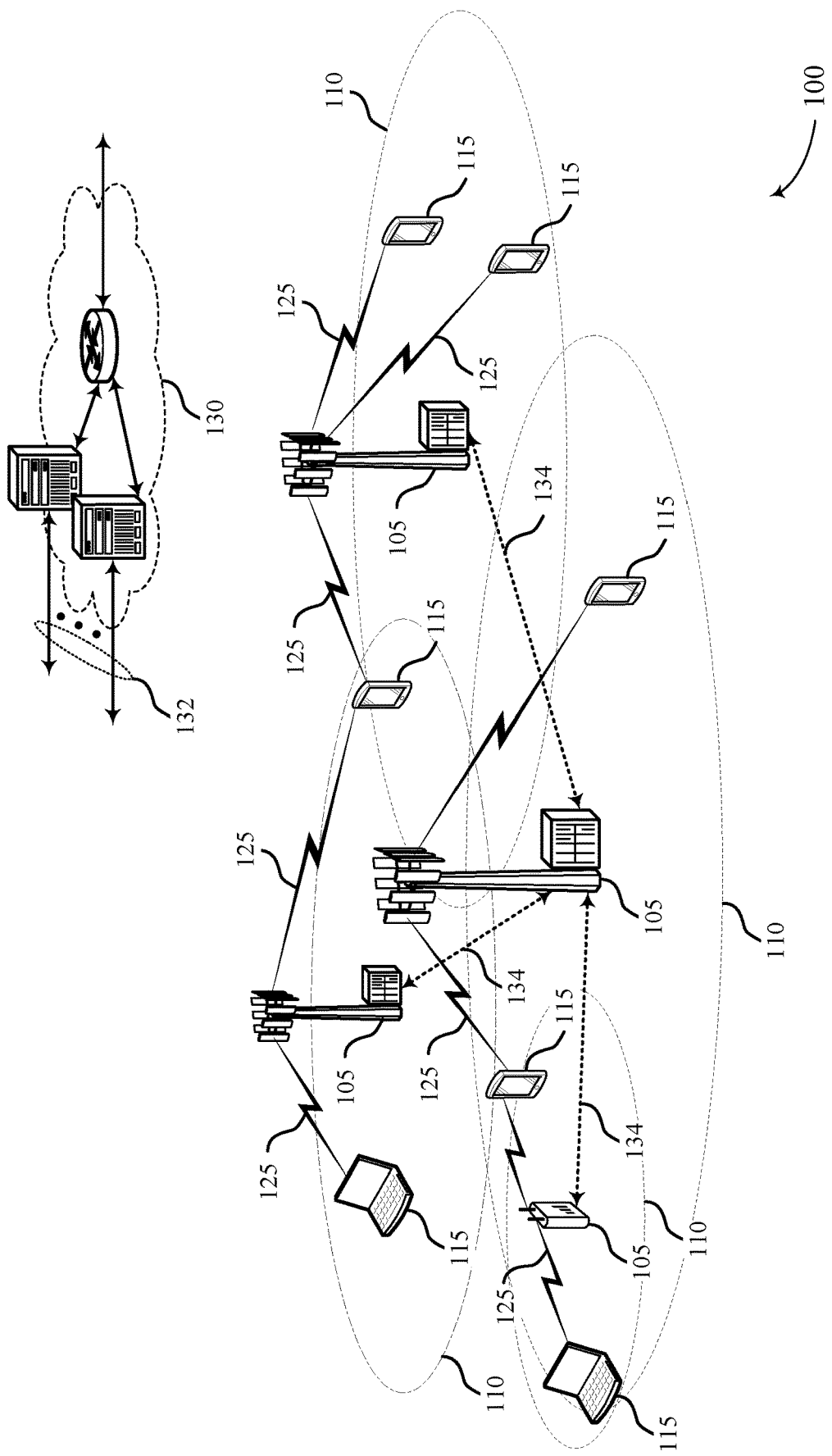
FIG. 1 illustrates an example of a system for wireless communications that supports uplink control channel resource definition and mapping to user equipment in accordance with aspects of the present disclosure.

In some wireless communication systems, such as a fifth generation (5G) or New Radio (NR) system, a wireless device such as a user equipment (UE) may transmit uplink control information (UCI) to a base station via a physical uplink control channel (PUCCH). The UE and the base station may determine which transmission resources the UE will use for a subsequent PUCCH transmission and when the UE will use those transmission resources (e.g., during which transmission time interval (TTI), which may also be known as a slot, the UE is to send a UCI via the PUCCH).

Methods may be used to facilitate consistency between the base station's determination and the UE's determination regarding which transmission resources the UE is to use for a subsequent PUCCH transmission and the TTIs during which the UE is to use those transmission resources. In some cases, determining an uplink transmission resource to be used for the subsequent PUCCH transmission may include determining a PUCCH resource, which includes one or more uplink transmission resources. In some cases, the base station and the UE each may use one or more PUCCH resource definitions, one or more PUCCH resource mapping rules, and TTI mapping rules to ensure consistency. Use of these aspects of the present disclosure, alone or in combination, may enable the UE and the base station to consistently determine the same PUCCH resources and TTIs to be used for a subsequent PUCCH transmission by the UE while minimizing the number of transmitted symbols related to such determinations, thereby saving system resources such as power, frequency, time, and spectrum resources.

A PUCCH resource definition may include a set of index values, each associated with a predefined set of transmission resources such as resource block indices. The UE and the base station may use the PUCCH resource definition to efficiently determine transmission resources for a subsequent PUCCH transmission and, if necessary, exchange information regarding such determinations. For example, the base station may use a 3-bit DCI value in a DCI to identify the index of the PUCCH resources for the UE to choose (from a pool or set of indexed PUCCH resources) for a subsequent PUCCH transmission. The formats of TTIs may be flexible such that the initial and final PUCCH symbols of a given PUCCH transmission may not be predefined, and thus a PUCCH resource definition may also specify which symbols within a TTI the UE is to use for a PUCCH transmission.

PUCCH resource mapping rules may be explicit or implicit. When the base station and the UE use an explicit PUCCH resource mapping rule, the base station may determine and explicitly indicate to the UE which transmission resources the UE is to use for a subsequent PUCCH transmission and when the transmission resources are to be used. For example, an explicit resource mapping rule may be used if an amount of uplink control data to be included in the subsequent PUCCH transmission is above a threshold amount (e.g., a 2-bit UCI payload). In such cases, a pool or set of uplink transmission resources may be identified based at least in part on the amount of uplink control data being above the threshold amount, where the set may include uplink transmission resources having a PUCCH format compatible with the amount of uplink control data being above the threshold amount. A number of uplink transmission resources included in the set may then be identified, and if the number of uplink transmission resources included in the set is less than or equal to a threshold number (e.g., 8) of uplink transmission resources, the explicit resource mapping rule may be used. In some cases, the threshold number of uplink transmission resources may equal a maximum number of uplink transmission resources that may be uniquely identified in a downlink control information (DCI) field. For example, a 3-bit PUCCH resource indicator field transmitted in a DCI may be able to uniquely indicate one of a maximum number of 8 uplink transmission resources that the UE is configured to use for the subsequent PUCCH transmission. In some cases, an explicit resource mapping rule may be used if the amount of uplink control data to be included in the subsequent PUCCH transmission is less than or equal to a threshold amount (e.g., a 2-bit UCI payload) and the number of uplink transmission resources in the set of PUCCH resources having the PUCCH format to be used for the subsequent PUCCH transmission is less than or equal to the threshold number (e.g., 8) of uplink transmission resources.

An implicit resource mapping rule may be used if the amount of uplink control data to be included in the subsequent PUCCH transmission is less than or equal to a threshold amount (e.g., 2-bit UCI payload). In such cases, a set of uplink transmission resources is identified based at least in part on the amount of uplink control data being less than or equal to the threshold amount, where the set includes uplink transmission resources having a PUCCH format compatible with the amount of uplink control data being less than or equal to the threshold amount. A number of uplink transmission resources included in the set may then be identified, and if the number of uplink transmission resources included in the set is greater than a threshold number (e.g., 8) of uplink transmission resources, an implicit resource mapping rule may be used. For example, the base station may transmit the number of uplink transmission resources using a higher layer parameter which indicates that the UE is configured to use 32 uplink transmission resources for the subsequent PUCCH transmission. In such case, the UE may identify the 32 uplink transmission resources for the subsequent PUCCH transmission based on a mapping rule or formula known to both the base station and the UE. As such, when the base station configures the UE with more uplink transmission resources than can be uniquely identified by the explicit indicator field, the implicit resource mapping rule may be used. When the base station and the UE use an implicit PUCCH resource mapping rule, the base station may transmit to the UE a signal that does not include any explicit indication of which transmission resources the UE is to use for the subsequent PUCCH transmission; rather, the UE may determine that information according to a rule or formula known to both the base station and the UE. Whether the base station and the UE utilize an explicit PUCCH resource mapping rule or an implicit PUCCH resource mapping rule may depend on a format of the subsequent PUCCH transmission by the UE.

TTI mapping rules also may be explicit or implicit. When using an explicit TTI mapping rule, the base station may determine and explicitly indicate to the UE which TTIs the UE is to use for a subsequent PUCCH transmission. Another TTI mapping rule may be an implicit mapping rule. When using an implicit TTI mapping rule, the base station may determine which TTIs the UE is to use for a subsequent PUCCH transmission, though the base station may not explicitly indicate that information to the UE; rather, the base station may transmit a signal to the UE that does not include any explicit indication of the determined information, and the UE may determine that information according to the same TTI mapping rule used by the base station. Whether the base station and the UE utilize an explicit TTI mapping rule or an implicit TTI mapping rule may depend on whether the base station and the UE utilize an explicit PUCCH resource mapping rule or an implicit PUCCH resource mapping rule. When the base station and the UE use an explicit PUCCH resource mapping rule, the base station and the UE may also use an explicit TTI mapping rule. Similarly, when the base station and the UE use an implicit PUCCH resource mapping rule, the base station and the UE may also use an implicit TTI mapping rule. The base station and the UE may also use an implicit TTI mapping rule when using an explicit PUCCH resource mapping rule or an explicit TTI mapping rule when using an implicit PUCCH resource mapping rule. When using an implicit TTI mapping rule, the base station and the UE may apply one or more offsets to the TTI(s) used by the UE for a current or prior PUCCH transmission.

The various techniques described herein for defining and allocating PUCCH resources may be used to allocate PUCCH resources for a single TTI or across multiple TTIs. The above-described approach to defining and allocating PUCCH resources may also be used to allocate one set of PUCCH resources per TTI or multiple sets of PUCCH resources per TTI. The allocation of PUCCH resources across multiple TTIs may be referred to as slot aggregation.

Aspects of the disclosure are initially described in the context of a wireless communications system. Various examples of PUCCH resource definitions, PUCCH resource mapping rules, TTI mapping rules, and applications of the same are then described. Aspects of the disclosure are further illustrated by and described with reference to apparatus diagrams, system diagrams, and flowcharts that relate to uplink control channel resource definition and mapping to user equipment.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, a 5G network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). As another example, a subframe may include only a single slot having a duration of 1 ms, and each slot may contain 12 or 14 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI or a slot. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. As used herein, TTI refers to any one of a TTI, sTTI, slot, or mini-slot.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described herein, in some cases a network entity, such as a base station 105, and a wireless device, such as a UE 115, may use one or more PUCCH resource definitions, PUCCH resource mapping rules, and TTI mapping rules to determine the transmission resources and TTIs the UE 115 is to use for a subsequent PUCCH transmission. The PUCCH resource mapping rules and TTI mapping rules may be explicit or implicit and may rely on one or more indices to efficiently define or indicate the determined PUCCH resources and TTIs. The PUCCH resource mapping rules and TTI mapping rules and the indices, alone or in combination, may enable the base station 105 and the UE 115 to consistently determine the same PUCCH resources and TTIs to be used for a subsequent PUCCH transmission by the UE 115 while minimizing the number of transmitted symbols related to such determinations, thereby saving power, frequency, time, and spectrum resources.

The PUCCH may be an uplink physical channel carrying UCI, including Channel Quality Indicators (CQI), Hybrid Automatic Retransmission reQuest (HARQ) acknowledgement (ACK)/Negative ACK (HACK) (ACK/NACK) and uplink scheduling requests. See 3GPP TS36.211 Section 5.4. Thus, the PUCCH may be used for uplink (UL) acknowledgements (ACKs), scheduling requests (SRs) and CQI and other UL control information. A PUCCH may be mapped to a control channel defined by a code and two consecutive resource blocks. UL control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a random access channel (RACH) procedure. In other cases, an SR may not be assigned to a user equipment (UE) 115 through the RACH (e.g., synchronized UEs may or may not have a dedicated SR channel). PUCCH resources for SR and CQI may be lost when the UE 115 is no longer synchronized.

Figure 2:
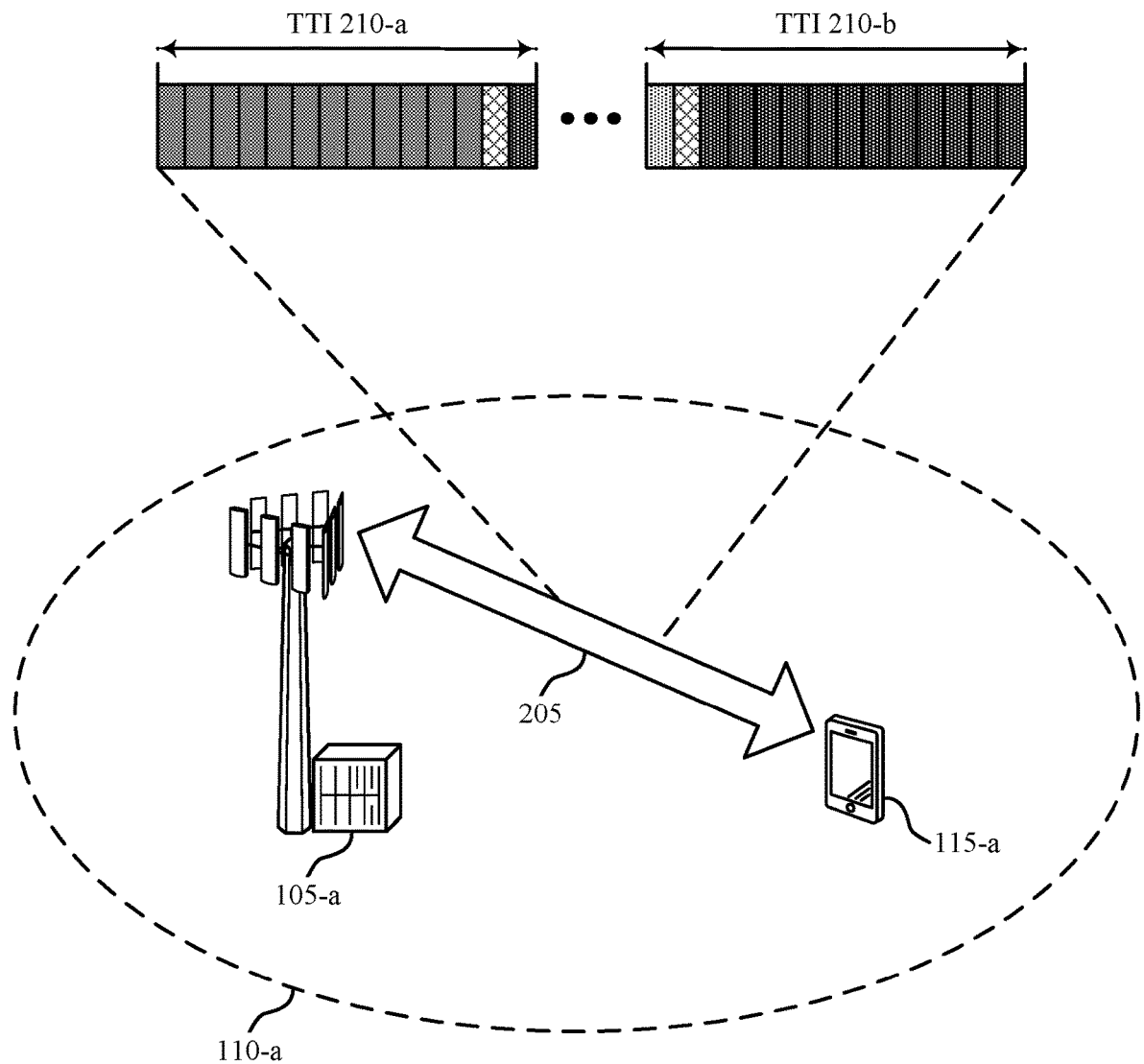
FIG. 2 illustrates an example of a system for wireless communications that supports uplink control channel resource definition and mapping to user equipment in accordance with aspects of the present disclosure.

FIG. 2 illustrates an example of a wireless communications system 200 that supports PUCCH resource definition and mapping in NR systems in accordance with various aspects of the present disclosure. Wireless communications system 200 includes base station 105-a and UE 115-a, which may be examples of a base station 105 and a UE 115 described with reference to wireless communications system 100. Base station 105-a may provide communication coverage for coverage area 110-a. Base station 105-a may communicate with UE 115-a on resources of one or more carriers 205 using TDD and/or FDD. In some cases, the carriers 205 may be organized such that they include frames of duration 10 ms, and the frames may include 10 subframes of duration 1 ms. The subframes may be further organized to include one or more TTIs 210 (e.g., self-contained TTIs), which may also be known as slots, and base station 105-a and UE 115-a may communicate during one or more TTIs 210.

TTIs 210 may include a plurality of symbols, such as 7 symbols or 14 symbols. The symbols may be binary or non-binary. For example, the symbols may be OFDM symbols that each represents more than one bit of data, such as binary phase shift keying (BPSK), quadrature phase shift keying (QPSK), or quadrature amplitude modulation (QAM) symbols (e.g., 16QAM or 64QAM symbols). TTIs 210 may include symbol periods allocated for downlink symbols 215, uplink symbols 220, and guard periods 225 that separate the downlink symbols 215 and uplink symbols 220. TTI 210-a may be an example of a downlink-centric TTI in an NR system, and TTI 210-b may be an example of an uplink-centric TTI in an NR system.

Figure 3:
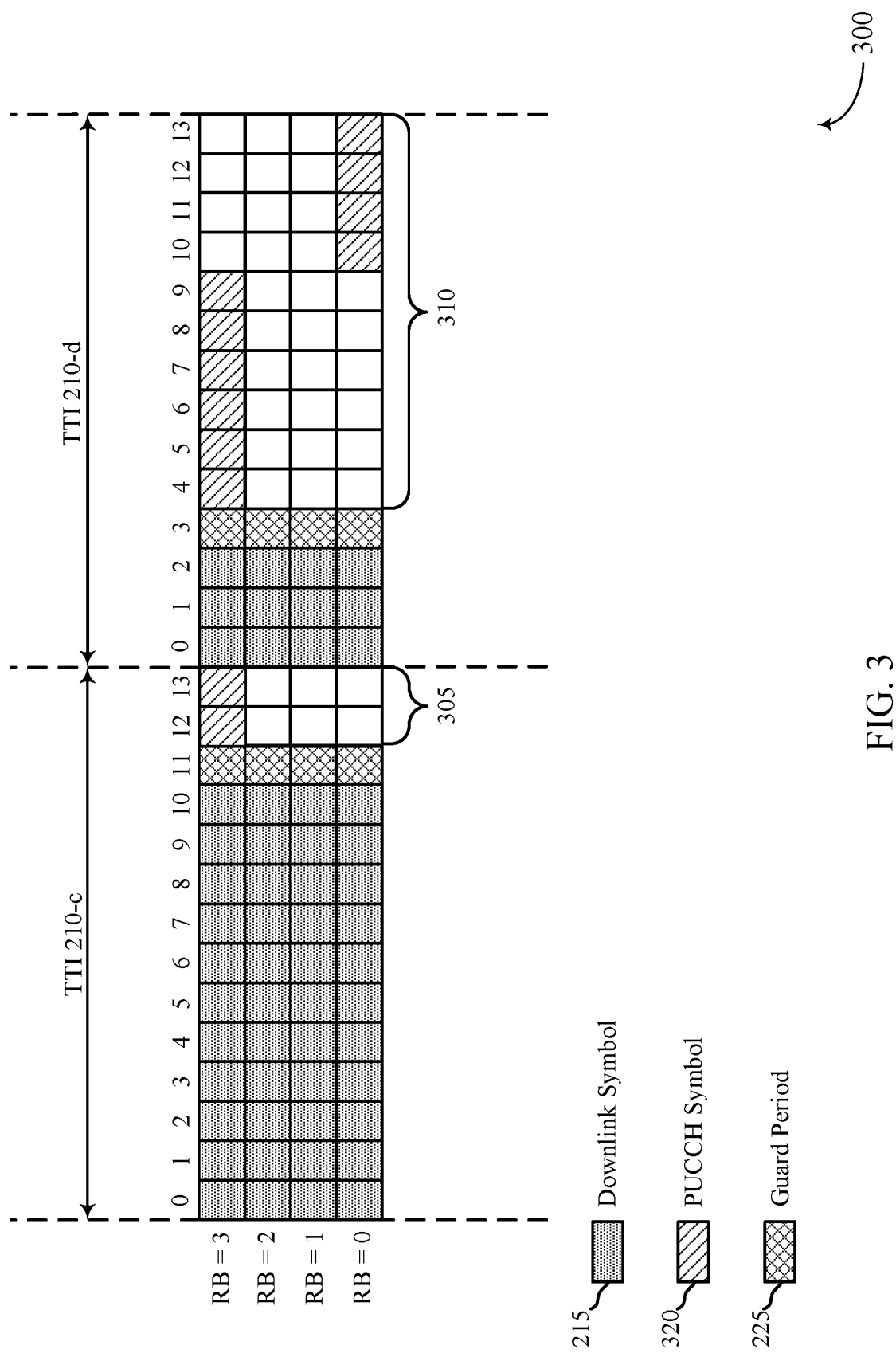
FIG. 3 illustrates an example of a resource allocation in accordance with aspects of the present disclosure.

UE 115-a may transmit UCI to base station 105-a by transmitting one or more PUCCH symbols representing the UCI data within one or more TTIs 210. A transmission of PUCCH symbols by UE 115-a may be known as a PUCCH transmission. As described herein, wireless communications system 200 may support efficient techniques for defining PUCCH resources and determining the transmission resources within a TTI 210 that UE 115-a is to use for a subsequent PUCCH transmission. Also as described herein, wireless communications system 200 may support efficient techniques for defining TTIs 210 and FIG. 3 illustrates an example of a resource allocation 300 in accordance with various aspects of the present disclosure. TTIs 210 may include a number of symbols each allocated for communication in a specific link direction or for transitioning between uplink and downlink configurations. The structure of each TTI 210 may be based on a nominal symbol period duration for symbols within the TTI, a numerology associated with one or more symbols within the TTI, a number of control symbols within the TTI, or a quantity of symbols of a specific link direction within the TTI within a carrier or across two or more carriers. In the example of FIG. 3, each TTI 210 may include 14 symbols. However, in other examples, a TTI may include a different number of symbols (e.g., 12 symbols).

For simplicity, FIG. 3 illustrates two TTIs 210-c, 210-d, each having a duration of 14 symbol durations, but one of ordinary skill in the art would appreciate that any number of TTIs 210 having a duration of any number of symbol durations may be used in accordance with the techniques herein. Similarly, FIG. 3 illustrates TTIs 210-c and 210-d as having four subcarriers or resource blocks (RBs), but one of ordinary skill in the art would appreciate that any number of RBs may be used in accordance with the techniques herein. TTIs 210-c may be adjacent to TTI 210-d in the time domain, and each TTI 210 may be self-contained. That is, each TTI may include downlink symbols 215 as well as uplink symbols such as PUCCH symbols 320, along with guard periods 225.

A UE 115 may use more than one PUCCH format for PUCCH transmissions. For example, the UE 115 may use a short PUCCH format 305 or a long PUCCH format 310. Short PUCCH format 305 may include a number of PUCCH symbols 320 up to some maximum symbol count, such as one or two PUCCH symbols 320. The UE 115 may use short PUCCH format 305 for brief or time-critical signaling, such as ACK/NACK signaling. For example, a base station 105 may include downlink symbols 215 in a TTI 210-c, and the UE 115 may use short PUCCH format 305 to subsequently send a PUCCH transmission including an ACK/NACK response in the same TTI 210-c. In some examples, a starting symbol and/or an end symbol of short PUCCH format 305 may be dynamically configured. For example, short PUCCH format 305 including 2 symbols may start at a first OFDM symbol of a TTI, at a fourth OFDM symbol of the TTI after downlink control information (e.g., PDCCH), or a twelfth OFDM symbol of the TTI. Thus, it may be useful for the UE 115 to be able to identify a symbol number of the TTI at which the starting symbol and/or end symbol of short PUCCH format 305 may be configured. In such cases, a PUCCH resource definition including a symbol number at which the starting and/or end symbol of short PUCCH format 305 to be configured may be helpful for both the UE 115 and the base station 105, along with a number of symbols included in short PUCCH format 305.

Long PUCCH format 310 may include a number of PUCCH symbols 320 that is greater than the maximum for short PUCCH format 305. For example, long PUCCH format may include a number of PUCCH symbols 320 up to the total number of symbols (e.g., 4-14 OFDM symbols) in a TTI 210. The UE 115 may use long PUCCH format 310 for less time-critical signaling, such as, for example, scheduling requests, channel quality indicators, and other UCI. The UE 115 may also use long PUCCH format 310 when robustness to noise and interference is a concern, such as when the UE 115 is at the edge of a cell 110 or the UE 115 or base station 105 determines that channel quality is below some threshold quality. In some examples, a starting symbol and/or an end symbol of long PUCCH format 310 may be dynamically configured. For example, long PUCCH format 310 including 7 symbols may start at a first OFDM symbol of a TTI, thereby rendering the TTI an uplink TTI, at a fourth OFDM symbol of the TTI after downlink control information (e.g., PDCCH), or an eighth OFDM symbol of the TTI. Thus, it may be useful for the UE 115 to be able to identify a symbol number of the TTI at which the starting symbol and/or end symbol of long PUCCH format 310 may be configured. In such cases, a PUCCH resource definition including a symbol number at which the starting and/or end symbol of long PUCCH format 310 to be configured may be helpful for both the UE 115 and the base station 105, along with a number of symbols included in long PUCCH format 310.

A single TTI 210 may sometimes include more than one PUCCH transmission, including PUCCH transmissions of more than one PUCCH format. For example, a single TTI 210 may include a long PUCCH format 310 transmission (e.g., symbols 4-13 of the TTI 210) followed by a short PUCCH format 305 transmission (e.g., symbols 12-13 of the TTI 210).

As illustrated in FIG. 3, PUCCH symbols 320 sent using either short PUCCH format 305 or long PUCCH format 310 may be separated from downlink symbols 215 by a guard period 225. Also, PUCCH symbols 320 sent using either short PUCCH format 305 or using long PUCCH format 310 may be sent using the same RB or using different RBs within the same TTI 210. In this manner, frequency hopping may be used within the context of a single PUCCH transmission (e.g., as shown in TTI 210-d), and thus increase the robustness of the PUCCH transmission to noise and interference, such as multipath interference.

Figure 4:
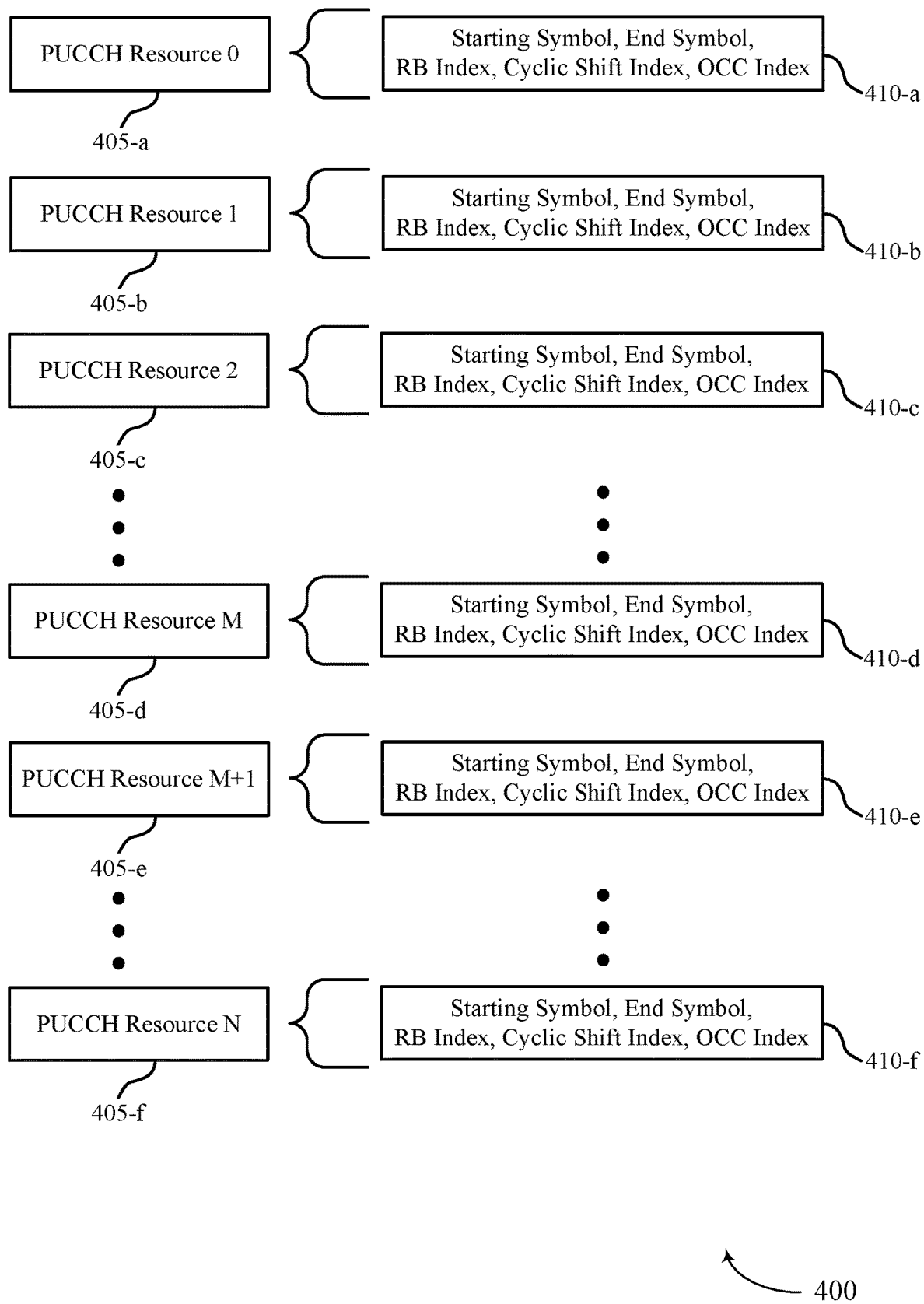
FIG. 4 illustrates an example of an uplink control channel resource definition in accordance with aspects of the present disclosure.

FIG. 4 illustrates an example of a PUCCH resource definition 400 in accordance with various aspects of the present disclosure. In some examples, PUCCH resource definition 400 may be implemented by aspects of wireless communications system 100 or 200.

PUCCH resources 405 are each defined as corresponding to a collection of one or more uplink transmission resources 410. The formats of TTIs 210 may be flexible such that the initial and final PUCCH symbols 320 of a given PUCCH transmission may not be predefined for either short PUCCH format 305 or long PUCCH format 310. Thus, the definition of a PUCCH resource 405 may also include information regarding the symbol range (possibly a range of one symbol) within a TTI 210 that the UE 115 is to use for a PUCCH transmission. For example, the definition of a PUCCH resource may include a starting symbol index and an end symbol index within the TTI 210. Alternatively, the definition of a PUCCH resource may include a starting symbol index or an end symbol index within the TTI 210 along with a total number of PUCCH symbols 320.

PUCCH resource 0 (e.g., 405-a) is defined as a collection of transmission resources 410-a, which includes a combination of a starting symbol, end symbol, RB index, cyclic shift index, and a time domain-orthogonal cover code (TD-OCC) index. The starting symbol and/or the end symbol may depend on an OFDM numerology (e.g., subcarrier spacing in CCs) and bandwidth part (BWP) (e.g., a bandwidth portion that a UE 115 may support when a base station 105 supports such a large system bandwidth that the UE 115 may not be capable of supporting). The cyclic shift index may be a demodulation reference signal (DMRS) sequence cyclic shift index. Similarly, PUCCH resource 1 (e.g., 405-b) is defined as a collection of transmission resources 410-b, which includes a distinct combination of a starting symbol, end symbol, RB index, cyclic shift index, and OCC index. The transmission resources 410 may include fewer, more, or different types of transmission depending on the type of communications system in which PUCCH resource definition and mapping are utilized.

In some cases, a first set of PUCCH resources 405 may be available for long PUCCH format 310 transmissions, and a second set of PUCCH resources 405 may be available for short PUCCH format 305 transmissions. In PUCCH resource definition 400, for example, PUCCH resources 0 through M (e.g., 405-a, 405-b, 405-c, 405-d) may be available for long PUCCH format 310 transmissions while PUCCH resources M+1 through N (e.g., 405-e through 405-f) may be available for short PUCCH format 305 transmissions. One of ordinary skill in the art will recognize that M and N may each be any integer value.

A base station 105 may explicitly indicate to a UE 115 the uplink transmission resources that the UE 115 is to use for a subsequent PUCCH transmission by transmitting to the UE 115 an index number of one or more PUCCH resources 405. For example, the base station 105 may explicitly signal the uplink transmission resources in a DCI in PDCCH transmission. In such cases, an explicit resource mapping rule may be used if the amount of uplink control data to be included in the subsequent PUCCH transmission is above a threshold amount (e.g., 2-bit UCI payload). For example, a set including uplink transmission resources having a PUCCH format compatible with the amount of uplink control data being above the threshold amount may include a number of uplink transmission resources less than or equal to a threshold number (e.g., 8) of uplink transmission resources. In some cases, the threshold number of uplink transmission resources may equal a maximum number of uplink transmission resources that may be uniquely identified in a downlink control information (DCI) field. For example, a 3-bit PUCCH resource indicator field transmitted in a DCI may indicate a maximum number of 8 uplink transmission resources that the UE is configured to use for the subsequent PUCCH transmission. In some cases, an explicit resource mapping rule may be used if the amount of uplink control data to be included in the subsequent PUCCH transmission is less than or equal to a threshold amount (e.g., a 2-bit UCI payload) and the number of uplink transmission resources in the set of PUCCH resources having the PUCCH format to be used for the subsequent PUCCH transmission is less than or equal to the threshold number (e.g., 8) of uplink transmission resources.

Alternatively, the UE 115 may derive which uplink transmission resources the UE 115 is to use for a subsequent PUCCH transmission based on an implicit PUCCH resource mapping rule. For example, the UE 115 may derive which uplink transmission resources to use if the amount of uplink control data to be included in the subsequent PUCCH transmission is less than or equal to a threshold amount (e.g., a 2-bit UCI payload). In such cases, a set of uplink transmission resources is identified based at least in part on the amount of uplink control data being less than or equal to the threshold amount, where the set includes uplink transmission resources having a PUCCH format compatible with the amount of uplink control data being less than or equal to the threshold amount. A number of uplink transmission resources included in the set may then be identified, and if the number of uplink transmission resources included in the set is above a threshold number (e.g., 8) of uplink transmission resources, an implicit resource mapping rule may be used. For example, the base station may transmit the number of uplink transmission resources using a higher layer parameter which indicates that the UE is configured to use 32 uplink transmission resources for the subsequent PUCCH transmission. In such case, the UE may identify the 32 uplink transmission resources for the subsequent PUCCH transmission based on a mapping rule or formula known to both the base station and the UE. As such, when the base station configures the UE with more uplink transmission resources than can be uniquely identified by the explicit indicator field, the implicit resource mapping rule may be used. In another example, the UE 115 may identify the transmission resources used by the base station 105 for a downlink transmission (e.g., a downlink control information (DCI) transmission).

In some cases, the UE 115 may derive an allocation of uplink resources for transmitting, e.g., ACK/NACK for a PDCCH granting a scheduling of PDSCH data, from a lowest control channel element (CCE) index used for the PDCCH, and use the lowest CCE index to map the uplink resources based on a pre-defined mapping rule known to both the UE 115 and the base station 105. As such, both the UE 115 and the base station 105 may determine which uplink transmission resources the UE 115 is to use for a subsequent PUCCH transmission based in part on at least one of the downlink transmission resources, the amount of uplink control data to be included in the subsequent PUCCH transmission, or the number of uplink transmission resources included in a set which includes uplink transmission resources having a PUCCH format compatible with the amount of uplink control data to be included in the subsequent PUCCH transmission according to an implicit PUCCH resource mapping rule known to both the UE 115 and the base station 105. As another example, the UE 115 may derive which uplink transmission resources the UE 115 is to use for a subsequent PUCCH transmission based in part on the PUCCH resource 405 used by the UE 115 for a current or prior PUCCH transmission according to an implicit PUCCH resource mapping rule known to both the UE 115 and the base station 105. As an example of an implicit PUCCH resource mapping rule, both the UE 115 and the base station 105 may determine the index number of the PUCCH resource 405 for the subsequent PUCCH transmission by incrementing or decrementing the index number of the PUCCH resource 405 used for a current or prior PUCCH transmission according to a particular offset. The offset may be any integer value, including zero.

Whether the PUCCH resource mapping rule is implicit or explicit may depend on the format of the subsequent PUCCH transmission. For example, whether the PUCCH resource mapping rule is implicit or explicit may depend on whether the format of the subsequent PUCCH transmission is a short PUCCH format 305 or a long PUCCH format 310. Whether the PUCCH resource mapping rule is implicit or explicit may also depend on the type of UCI data to be included in the subsequent PUCCH transmission. For example, an implicit PUCCH resource mapping rule may be used for ACK/NACK-only PUCCH transmissions, and an explicit PUCCH resource mapping rule may be used for PUCCH transmissions including any non-ACK/NACK data (e.g., SR or CQI data). As another example, an implicit PUCCH resource mapping rule may be used for ACK/NACK-only PUCCH transmissions as well as simultaneous transmission of ACK/NACK data and SR data, but with a different resource set used if the subsequent PUCCH transmission will include SR data. Whether the PUCCH resource mapping rule is implicit or explicit may also depend on the amount of UCI data to be included in the subsequent PUCCH transmission, such as whether that amount does or does not exceed a threshold amount. For example, a base station 105 and a UE 115 may identify an implicit PUCCH resource mapping rule whenever a subsequent PUCCH transmission will have a short PUCCH format 305 and an explicit PUCCH resource mapping rule whenever a subsequent PUCCH transmission will have a long PUCCH format 310. Alternatively, a base station 105 and a UE 115 may identify an implicit PUCCH resource mapping rule whenever a subsequent PUCCH transmission will include an amount of UCI data less than or equal to a threshold amount and an explicit PUCCH resource mapping rule whenever a subsequent PUCCH transmission will include an amount of UCI data above the threshold amount. The threshold amount may be one or two bits of UCI data. Use of an implicit PUCCH resource mapping rule whenever a subsequent PUCCH transmission will be of a short PUCCH format 305 and/or include a relatively lower amount of UCI data avoids the need for a base station 105 to explicitly signal to a UE 115 which transmission resources the UE 115 is to use for a subsequent PUCCH transmission in at least some circumstances.

Defining PUCCH resources 405 as index values each corresponding to particular transmission resources 410 enables the base station 105 and the UE 115 to efficiently determine and identify the uplink transmission resources to be used for a subsequent PUCCH transmission, thereby saving system resources such as power and time resources. Such an approach also minimizes the amount of transmitted symbols related to such determinations, thereby saving system resources such as power, time, frequency, and spectrum resources. In some cases, using an implicit PUCCH resource mapping rule also further minimizes the amount of transmitted symbols related to such determinations, thereby saving system resources such as power, time, frequency, and spectrum resources.

Figure 5:
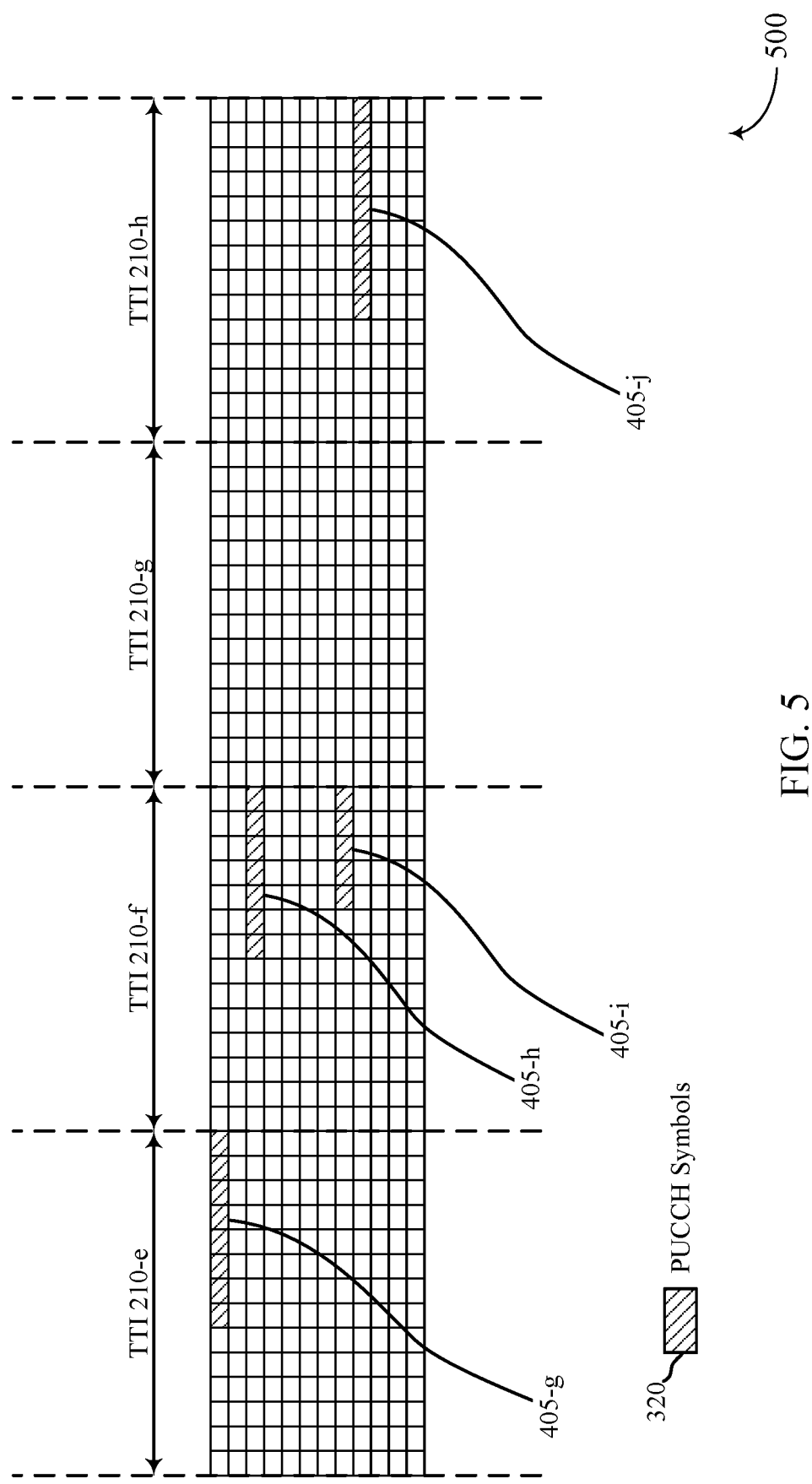
FIG. 5 illustrates an example of a resource allocation that supports uplink control channel resource definition and mapping in accordance with aspects of the present disclosure.

FIG. 5 illustrates an example of a resource allocation 500 in accordance with various aspects of the present disclosure. In some examples, a wireless device and a network entity may be examples of a UE 115 and a base station 105 such as those shown in communications systems 100 and 200 with reference to FIGS. 1 and 2, and may communicate according to the principles illustrated by resource allocation 500.

In the example of FIG. 5, a PUCCH transmission is illustrated as spanning multiple TTIs 210, a concept which may be known as TTI aggregation or slot aggregation. For example, a UE 115 may transmit a PUCCH transmission using multiple PUCCH resources 405, which may include the use of multiple PUCCH resources 405 in a single TTI 210 and may also include the use of PUCCH resources 405 in different TTIs 210. For example, resource allocation 500 illustrates a PUCCH transmission that via a first PUCCH resource 405-g in a first TTI 210-e, a second PUCCH resource 405-h in a second TTI 210-f, a third PUCCH resource 405-i in the second TTI 210-f, no PUCCH resources in a third TTI 210-g, and a fourth PUCCH resource 405-j in a fourth TTI 210-h. One of ordinary skill in the art will appreciate that any combination of PUCCH resources 405 within any number of TTIs 210 may be utilized by a UE 115 for a PUCCH transmission.

Resource allocation 500 may be determined and explicitly indicated by a base station 105. For example, the base station 105 may transmit to a UE 115 a signal having an explicit indication of which PUCCH resource(s) 405 the UE 115 is to use for a subsequent PUCCH transmission and, as part of the same signal or as a separate signal, an explicit indication of the TTI(s) 210 in which the UE 115 is to use those uplink transmission resources. For each PUCCH resource 405 and TTI 210 combination, the explicit indications sent by the base station 105 may be an index number corresponding to the PUCCH resource 405 as well as an index number corresponding to the TTI 210. TTIs 210 may be indexed relative to the current TTI 210. For example, TTI 210-e may be the current TTI and thus TTI index 0, with TTIs 210-f through 210-h thus being TTI indices 1 through 3 respectively. The base station 105 and the UE 115 may use an explicit TTI mapping rule when they use an explicit PUCCH resource mapping rule or an implicit PUCCH resource mapping rule.

Resource allocation 500 may also be implicitly determined by both the base station 105 and the UE 115. For example, the implicit TTI mapping rule may include a predefined pattern of offsets relative to an index for an initial PUCCH resource 405 as determined by the implicit PUCCH resource mapping rule and relative to a current or immediately upcoming TTI 210. For example, if the implicit PUCCH resource mapping rule indicates that a PUCCH resource 405 having index number 1 is to be used, the implicit TTI mapping rule may indicate that (i) a PUCCH resource 405 having index number 1 is to be used for the first TTI 210, (ii) a PUCCH resource 405 having index number 2 is to be used for the second TTI 210, and (iii) a PUCCH resource 405 having index number 3 is to be used for the third TTI 210. As such, aggregated TTIs or slots (under either the implicit TTI mapping rule or the explicit TTI mapping rules) may not be contiguous to one another (e.g., TTI 210-f and TTI 210-h), and multiple PUCCH resources may be configured in one TTI (e.g., TTI 201-f). One of ordinary skill in the art will appreciate that more complicated offset patterns are also possible, including offset patterns that do not adjust the PUCCH resource 405 index and the TTI 210 index equally, or adjust one index without adjusting the other, or similar variations. The base station 105 and the UE 115 may use an implicit TTI mapping rule whenever they use an implicit PUCCH resource mapping rule or an explicit PUCCH resource mapping rule.

Figure 6:
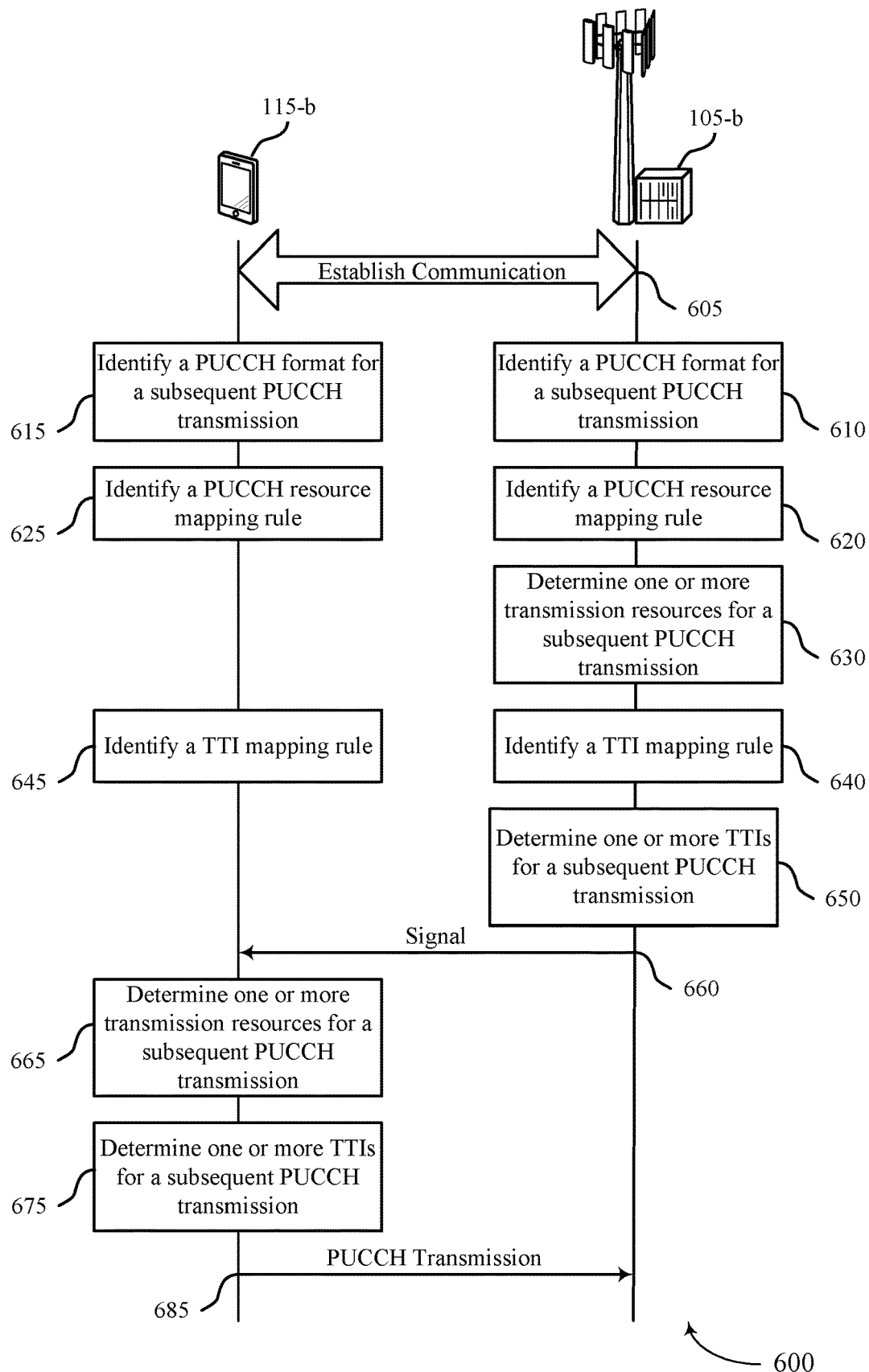
FIG. 6 illustrates an example of a process flow for uplink control channel resource definition and mapping to user equipment in accordance with aspects of the present disclosure.

FIG. 6 illustrates an example of a process flow 600 that supports uplink control channel resource definition and mapping to user equipment in accordance with various aspects of the present disclosure. In some examples, a base station 105 and a UE 115 within communications systems 100 or 200 may implement aspects of process flow 600.

Base station 105-b and UE 115-b may establish communication 605 according to established connection establishment techniques for the wireless communications system.

At block 610, base station 105-b may identify a PUCCH format for a subsequent PUCCH transmission 685 by UE 115-b. Base station 105-b may identify the PUCCH format, for example, as either a short PUCCH format 305 or a long PUCCH format 310. Base station 105-b also may identify the PUCCH format, for example, as one including a particular amount of UCI data, which may or may not be above a threshold amount (e.g., one or two bits of UCI data). Base station 105-b may also identify the PUCCH format by identifying the type of UCI data to be included in the subsequent PUCCH transmission 685—e.g., whether the subsequent PUCCH transmission 685 will include ACK/NACK data, SR data, CQI data, another type of UCI, or a combination thereof.

At block 615, UE 115-b may identify a PUCCH format for a subsequent PUCCH transmission 685 to base station 105-b. UE 115-b may identify the PUCCH format, for example, as either a short PUCCH format 305 or a long PUCCH format 310. UE 115-b also may identify the PUCCH format, for example, as one including a particular amount of UCI data, which may or may not be above a threshold amount (e.g., one or two bits of UCI data). UE 115-b may also identify the PUCCH format by identifying the type of UCI data to be included in the subsequent PUCCH transmission 685—e.g., whether the subsequent PUCCH transmission 685 will include ACK/NACK data, SR data, CQI data, another type of UCI, or a combination thereof. UE 115-b may identify the same PUCCH format at block 615 that base station 105-b identifies at block 610.

At block 620, base station 105-b may identify a PUCCH resource mapping rule based at least in part on the PUCCH format for the subsequent PUCCH transmission 685 by UE 115-b. For example, if the PUCCH format is a long PUCCH format 310 and/or includes an amount of UCI data above the threshold amount, base station 105-b may identify an explicit PUCCH resource mapping rule. As another example, if the PUCCH format is a short PUCCH format 305 and/or includes an amount of UCI data less than or equal to the threshold amount, base station 105-b may identify an implicit PUCCH resource mapping rule. As yet another example, whether the PUCCH resource mapping rule is implicit or explicit may depend on the type of UCI data to be included in the subsequent PUCCH transmission. For example, base station 105-b may identify an implicit PUCCH resource mapping rule for ACK/NACK-only PUCCH transmissions and an explicit PUCCH resource mapping rule for PUCCH transmissions including any non-ACK/NACK data (e.g., SR or CQI data). As another example, base station 105-b may identify an implicit PUCCH resource mapping rule for ACK/NACK-only PUCCH transmissions as well as simultaneous transmissions of ACK/NACK data and SR data, but with a different resource pool or set used if the subsequent PUCCH transmission 685 will include SR data.

At block 625, UE 115-*b* may identify a PUCCH resource mapping rule based at least in part on the PUCCH format for the subsequent PUCCH transmission 685 by UE 115-*b*. For example, if the PUCCH format is a long PUCCH format 310 and/or includes an amount of UCI data above a threshold amount, UE 115-*b* may identify an explicit PUCCH resource mapping rule. As another example, if the PUCCH format is a short PUCCH format 305 and/or includes an amount of UCI data below the threshold amount (e.g., 1 or 2 bits), UE 115-*b* may identify an implicit PUCCH resource mapping rule. As yet another example, identifying whether the PUCCH resource mapping rule is implicit or explicit may depend on the type of UCI data to be included in the subsequent PUCCH transmission. For example, UE 115-*b* may identify an implicit PUCCH resource mapping rule for ACK/NACK-only PUCCH transmissions and an explicit PUCCH resource mapping rule for PUCCH transmissions including any non-ACK/NACK data (e.g., SR or CQI data). As another example, UE 115-*b* may identify an implicit PUCCH resource mapping rule for ACK/NACK-only PUCCH transmissions as well as simultaneous transmissions of ACK/NACK data and SR data, but with a different resource pool or set used if the subsequent PUCCH transmission 685 will include SR data. UE 115-*b* may identify the same PUCCH resource mapping rule at block 625 that base station 105-*b* identifies at block 620.

At block 630, base station 105-*b* may determine, based at least in part on the PUCCH resource mapping rule identified at block 620, an uplink transmission resource for UE 115-*b* to use for the subsequent PUCCH transmission 685. The uplink transmission resource to be used by UE 115-*b* may include one or more symbols and RBs within one or more TTIs 210, which may also be known as slots. For example, base station 105-*b* may determine that UE 115-*b* is to use a particular range of symbols, a particular RB, a particular cyclic shift, or a particular orthogonal cover code for the subsequent PUCCH transmission 685. The one or more transmission resources to be used by UE 115-*b* may be defined as a transmission resource 410 and indexed as corresponding to a predefined PUCCH resource 405. The range of symbols within a TTI 210 to be used by UE 115-*b* for PUCCH transmissions may not be predefined, and thus may be defined as part of a PUCCH resource 405 and represented by, for example, a starting symbol index and an end symbol index, a starting symbol index and a symbol count, or an end symbol index and a symbol count. As an example, when using an implicit PUCCH resource mapping rule, base station 105-*b* may determine the uplink transmission resource to be used by UE 115-*b* by incrementing or decrementing by some integer amount (possibly zero) the index of a PUCCH resource 405 used for a current or prior PUCCH transmission by UE 115-*b*. As another example, when using an implicit PUCCH resource mapping rule, base station 105-*b* may determine the uplink transmission resource to be used by UE 115-*b* based on the resources used by base station 105-*b* for a current or prior downlink transmission to UE 115-*b*. As yet another example, when using an implicit PUCCH resource mapping rule, the UE 115-*b* may identify which uplink transmission resources to use for the subsequent PUCCH transmission 685 based on a mapping rule or formula known to both the base station 105-*b* and the UE 115-*b*.

At block 640, base station 105-*b* may identify a TTI mapping rule. Base station 105-*b* may, for example, identify the TTI mapping rule based at least in part on the PUCCH resource mapping rule identified at block 620. For example, if the PUCCH resource mapping rule is explicit, base station 105-*b* may identify an explicit TTI mapping rule. As another example, if the PUCCH resource mapping rule is implicit, base station 105-*b* may identify an implicit TTI mapping rule. Base station 105-*b* may also identify an implicit TTI mapping rule after having identified an explicit PUCCH resource mapping rule or may identify an explicit TTI mapping rule after having identified an implicit PUCCH resource mapping rule.

At block 645, UE 115-*b* may identify a TTI mapping rule. UE 115-*b* may, for example, identify the TTI mapping rule based at least in part on the PUCCH resource mapping rule identified by UE 115-*b* at block 625. For example, if the PUCCH resource mapping rule is explicit, UE 115-*b* may identify an explicit TTI mapping rule. As another example, if the PUCCH resource mapping rule is implicit, UE 115-*b* may identify an implicit TTI mapping rule. UE 115-*b* may also identify an implicit TTI mapping rule after having identified an explicit PUCCH resource mapping rule or may identify an explicit TTI mapping rule after having identified an implicit PUCCH resource mapping rule. UE 115-*b* may identify the same TTI mapping rule at block 645 that base station 105-*b* identifies at block 640.

At block 650, base station 105-*b* may determine, based at least in part on the TTI mapping rule identified at block 640, one or more TTIs 210 in which UE 115-*b* is to use for the transmission resources determined at block 630. In some cases, base station 105-*b* may determine that UE 115-*b* is to use multiple PUCCH resources 405 within a single TTI 210. In the same or other cases, base station 105-*b* may determine that UE 115-*b* is to use one or more PUCCH resources 405 within multiple TTIs 210. As an example, when using an implicit TTI mapping rule, base station 105-*b* may determine the TTI(s) to be used by UE 115-*b* according to a predefined pattern of offsets relative to a TTI in which UE 115-*b* has used in a prior or current PUCCH transmission. As another example, when using an implicit TTI mapping rule, base station 105-*b* may determine the TTI(s) to be used by UE 115-*b* according to a predefined pattern of offsets relative to an immediately upcoming TTI.

UE 115-*b* may perform the methods steps associated with blocks 615, 625, and 645 at any time relative to when base station 105-*b* performs the method steps associated with blocks 610, 620, 630, 640, and 650.

Base station 105-*b* may then transmit a signal 660 that is received by UE 115-*b*. The signal 660 may be indicative of the uplink transmission resource determined by base station 105-*b* at block 630. The signal 660 may also be indicative of the TTI determined by base station 105-*b* at block 650. One signal 660 is illustrated for simplicity, but alternatively, base station 105-*b* may send two separate signals to communicate the uplink transmission resource determined by base station 105-*b* at block 630 and the TTI determined by base station 105-*b* at block 650.

If, at block 620, base station 105-*b* identified an explicit PUCCH resource mapping rule, then signal 660 may include an explicit indication of the uplink transmission resource determined by base station 105-*b* at block 630. The explicit indication of the uplink transmission resource determined by base station 105-*b* at block 630 may include one or more index values, each corresponding to a PUCCH resource 405. If, at block 620, base station 105-*b* identified an implicit PUCCH resource mapping rule, then signal 660 may not include the explicit indication of the uplink transmission resource determined by base station 105-*b* at block 630. As such, rather, UE 115-*b* may independently derive the transmission resource determined by base station 105-*b* at block 630 by applying the same implicit PUCCH resource mapping rule identified by base station 105-*b* at block 620 and by UE 115-*b* at block 625.

If, at block 640, base station 105-*b* identified an explicit TTI mapping rule, then signal 660 may include an explicit indication of the uplink transmission resource determined by base station 105-*b* at block 630. The explicit indication of the uplink transmission resource determined by base station 105-*b* at block 630 may include one or more index values, each corresponding to a particular TTI 210. The explicit indication of the uplink transmission resource determined by base station 105-*b* at block 630 may also include one or more index values that each corresponding to an offset relative to a current or prior TTI 210. If, at block 640, base station 105-*b* identified an implicit TTI mapping rule, then signal 660 may not include an explicit indication of the uplink transmission resources determined by base station 105-*b* at block 630; rather, UE 115-*b* may independently derive the TTI mapping rule determined by base station 105-*b* at block 640 by applying the same implicit TTI mapping rule identified by base station 105-*b* at block 640 and by UE 115-*b* at block 645.

At block 665, UE 115-*b* may determine, based at least in part on the PUCCH resource mapping rule identified at block 625, an uplink transmission resource for UE 115-*b* to use for the subsequent PUCCH transmission 685. As described above, the uplink transmission resource to be used by UE 115-*b* may include one or more symbols and RBs within one or more TTIs 210. For example, UE 115-*b* may determine that UE 115-*b* is to use a particular range of symbols, a particular RB, a particular cyclic shift, or a particular orthogonal cover code for the subsequent PUCCH transmission 685. The one or more transmission resources to be used by UE 115-*b* may be defined as a transmission resource 410 and indexed as corresponding to a predefined PUCCH resource 405. The range of symbols within a TTI 210 to be used by UE 115-*b* for PUCCH transmissions may not be predefined, and thus may be defined as part of a PUCCH resource 405 and represented by, for example, a starting symbol index and an end symbol index, a starting symbol index and a symbol count, or an end symbol index and a symbol count. As an example, when using an explicit PUCCH resource mapping rule or an explicit TTI mapping rule, UE 115-*b* may determine the uplink transmission resource(s) and TTI(s) to be used for the subsequent PUCCH transmission 685 by identifying one or more explicit indications of those uplink transmission resource(s) and TTI(s) included in signal 660. As another example, when using an implicit PUCCH resource mapping rule, UE 115-*b* may determine the uplink transmission resource to be used for the subsequent PUCCH transmission 685 by incrementing or decrementing by some integer amount (possibly zero) the index of a PUCCH resource 405 used for a current or prior PUCCH transmission by UE 115-*b*. As yet another example, when using an implicit PUCCH resource mapping rule, UE 115-*b* may determine the uplink transmission resource to be used by UE 115-*b* based on the resources used by base station 105-*b* for a current or prior downlink transmission to UE 115-*b*—e.g., UE 115-*b* may determine the uplink transmission resource to be used by UE 115-*b* for the subsequent PUCCH transmission 685 based on the resources used by base station 105-*b* for signal 660. As yet another example, when using an implicit PUCCH resource mapping rule, the UE 115-*b* may identify which uplink transmission resources to use for the subsequent PUCCH transmission 685 based on a mapping rule or formula known to both the base station 105-*b* and the UE 115-*b*.

At block 675, UE 115-*b* may determine, based at least in part on the TTI mapping rule identified at block 645, one or more TTIs 210 in which UE 115-*b* is to use the transmission resources determined at block 665. In some cases, UE 115-*b* may determine that UE 115-*b* is to use multiple PUCCH resources 405 within a single TTI 210. In the same or other cases, UE 115-*b* may determine that UE 115-*b* is to use one or more PUCCH resources 405 within multiple TTIs 210. As an example, when using an implicit TTI mapping rule, UE 115-*b* may determine the TTI(s) to be used by UE 115-*b* according to a predefined pattern of offsets relative to a TTI that UE 115-*b* has used for a prior or current PUCCH transmission. As another example, when using an implicit TTI mapping rule, UE 115-*b* may determine the TTI(s) to be used by UE 115-*b* according to a predefined pattern of offsets relative to an immediately upcoming TTI.

In one example, base station 105-*b* may have, at some time prior to the transmission of signal 660 transmitted to UE 115-*b*, a semi-static (e.g., signaled via RRC signaling) configuration or pool of uplink transmission resources to use for subsequent PUCCH transmissions, and signal 660 may include a grant to UE 115-*b* to send an uplink transmission, and UE 115-*b* may determine an uplink transmission resource and TTI to use for the subsequent PUCCH transmission 685 based at least in part on an implicit indication included in signal 660 (e.g., based in part on one or more downlink transmission resources used for signal 660, one or more TTIs used for signal 660, or the PUCCH format identified at block 615, possibly including the amount or type of UCI to be included in subsequent PUCCH transmission 685). In another example, UE 115-*b* may have, at some time prior to the transmission of signal 660, transmitted to base station 105-*b* an SR, and signal 660 may include a response to the SR previously transmitted by UE 115-*b*, which may include a grant to UE 115-*b* to send an uplink transmission, and UE 115-*b* may determine an uplink transmission resource and TTI to use for the subsequent PUCCH transmission 685 based at least in part on an implicit indication included in signal 660 (e.g., based in part on one or more downlink transmission resources used for signal 660, based in part on one or more TTIs used for signal 660, or based in part on the PUCCH format identified at block 615, possibly including the amount or type of UCI to be included in subsequent PUCCH transmission 685). After having determined which uplink transmission resources within a given TTI to use for subsequent PUCCH transmission 685, UE 115-*b* may use the determined uplink transmission resources within subsequent TTIs (with or without resource hopping or TTI offset patterns as described herein) until UE 115-*b* has transmitted all corresponding UCI to base station 105-*b*.

When UE 115-*b* identifies an implicit PUCCH resource mapping rule at block 625, UE 115-*b* may also perform the methods steps associated with block 665 before receiving the signal 660. Similarly, when UE 115-*b* identifies an implicit TTI mapping rule at block 645, UE 115-*b* may also perform the methods steps associated with block 675 before receiving the signal 660.

UE 115-*b* may then transmit a PUCCH transmission 685 to base station 105-*b* using the transmission resource(s) and TTI(s) determined at blocks 630, 650, 665, and 675. In one example, base station 105-*b* may identify PUCCH transmission 685 as having been transmitted by UE 115-*b* based at least in part on the uplink transmission resource(s) and TTI(s) via which PUCCH transmission 685 was transmitted.

Figure 7:
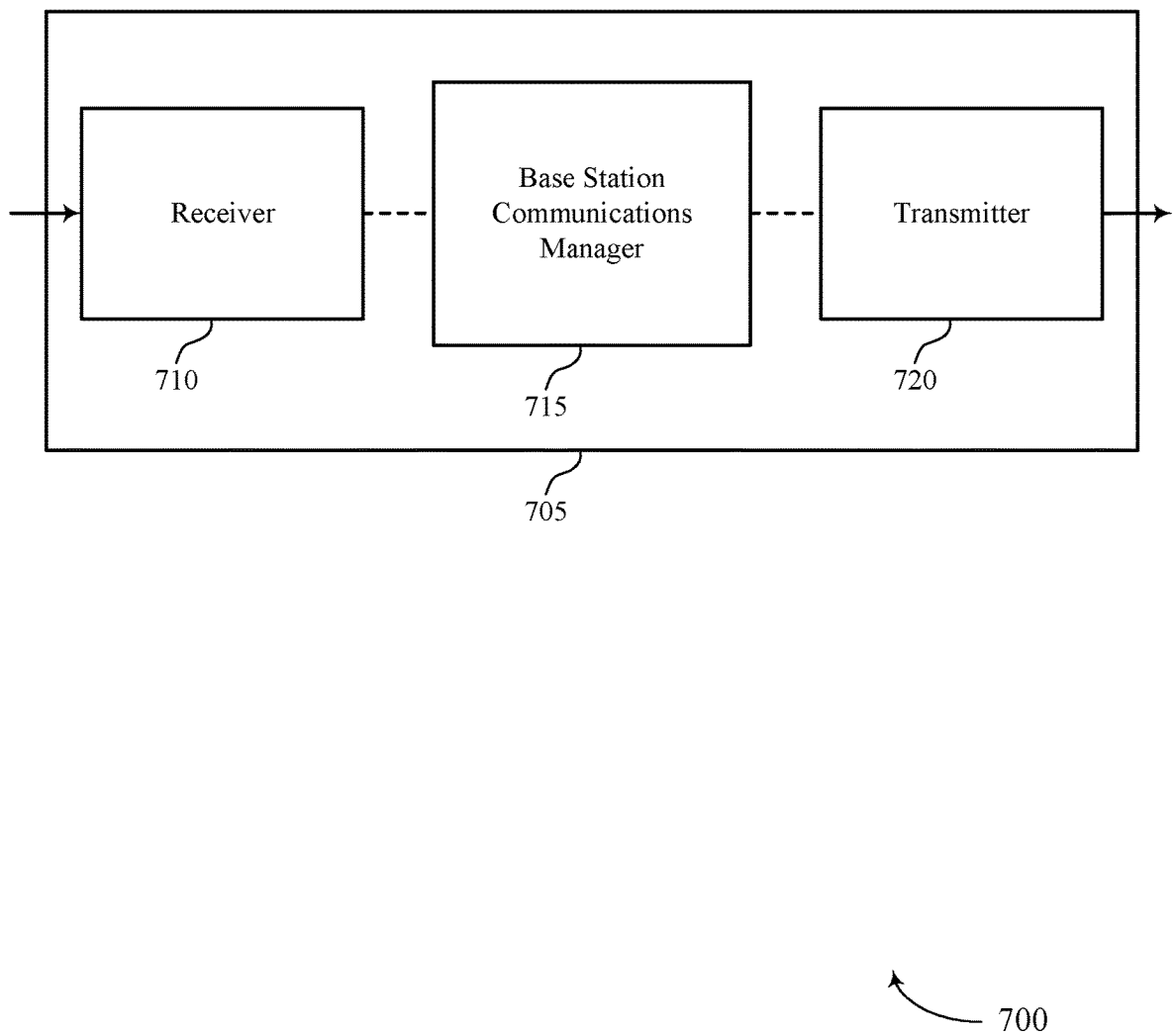
FIGS. 7 through 8 show block diagrams of a device that supports uplink control channel resource definition and mapping to user equipment in accordance with aspects of the present disclosure.

FIG. 7 shows a block diagram 700 of a wireless device 705 that supports NR-physical uplink control channel (PUCCH) Resource Definition and Mapping to user equipment (UE) in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink control channel resource definition and mapping to user equipment, etc.). Information may be passed on to other components of the device 705. Receiver 710 may be an example of aspects of transceiver 935 described with reference to FIG. 9. Receiver 710 may utilize a single antenna or a set of antennas.

Base station communications manager 715 may be an example of aspects of base station communications manager 915 described with reference to FIG. 9.

Base station communications manager 715 and/or at least some of its various sub-components may be implemented in hardware, software executed by a processor, firmware, or any combination thereof. If implemented in software executed by a processor, the functions of base station communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. Base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may identify a PUCCH format to be used for a subsequent PUCCH transmission, identify a PUCCH resource mapping rule based on the PUCCH format, and determine an uplink transmission resource to be used for the subsequent PUCCH transmission based on the PUCCH resource mapping rule.

Transmitter 720 may transmit signals generated by other components of the device. In some examples, transmitter 720 may be collocated with a receiver 710 in a transceiver module. For example, transmitter 720 may be an example of aspects of the transceiver 935 described with reference to FIG. 9. Transmitter 720 may utilize a single antenna or a set of antennas.

Transmitter 720 may transmit a signal indicative of the uplink transmission resource, include in the signal indicative of the uplink transmission resource an explicit indication of the uplink transmission resource to be used for the subsequent PUCCH transmission, transmit a signal indicative of the transmission time interval (TTI), and include in the signal indicative of the TTI an explicit indication of the TTI. In some cases, the explicit indication of the uplink transmission resource to be used for the subsequent PUCCH transmission includes an index representative of the uplink transmission resource. In some cases, the explicit indication of the TTI includes an index representative of an offset relative to a current TTI used for a current PUCCH transmission.

Figure 8:
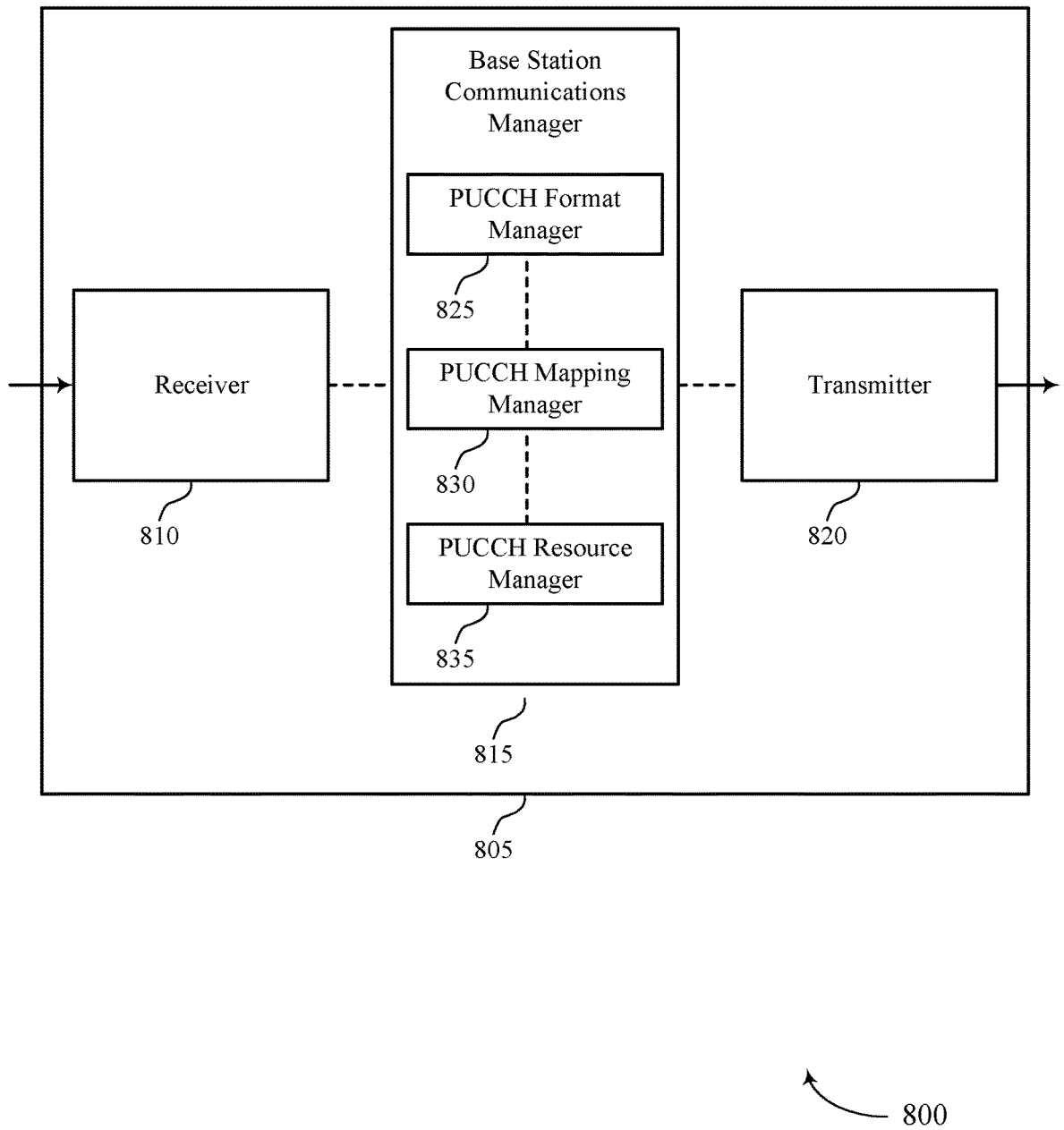

FIG. 8 shows a block diagram 800 of a wireless device 805 that supports uplink control channel resource definition and mapping to user equipment in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may communicate, directly or indirectly, with one another (e.g., via one or more buses).

Receiver 810 may receive information such as packets, user data, or control information associated with various information channels (e.g., control channels, data channels, and information related to uplink control channel resource definition and mapping to user equipment, etc.). Information may be passed on to other components of the device 805. Receiver 810 may be an example of aspects of transceiver 935 described with reference to FIG. 9. Receiver 810 may utilize a single antenna or a set of antennas.

Base station communications manager 815 may be an example of aspects of base station communications manager 915 described with reference to FIG. 9.

Base station communications manager 815 may also include PUCCH format manager 825, PUCCH mapping manager 830, and PUCCH resource manager 835.

PUCCH format manager 825 may identify a PUCCH format to be used for a subsequent PUCCH transmission. In some cases, identifying the PUCCH format to be used for the subsequent PUCCH transmission includes identifying an amount or a type of uplink control data to be included in the subsequent PUCCH transmission. In some cases, identifying the PUCCH format to be used for the subsequent PUCCH transmission includes determining whether the PUCCH format is a short PUCCH format or a long PUCCH format.

PUCCH mapping manager 830 may identify a PUCCH resource mapping rule based on the PUCCH format. PUCCH mapping manager 830 may also identify a TTI mapping rule based on the PUCCH resource mapping rule. In some cases, identifying the PUCCH resource mapping rule based on the PUCCH format may include identifying an implicit resource mapping rule if the amount of uplink control data to be included in the subsequent PUCCH transmission is less than or equal to a threshold amount (e.g., a 2-bit UCI payload) and an explicit resource mapping rule if the amount of uplink control data to be included in the subsequent PUCCH transmission is above the threshold amount (e.g., a 2-bit UCI payload). Identifying the PUCCH resource mapping rule based on the PUCCH format may also include identifying an implicit resource mapping rule if the uplink control data to be included in the subsequent PUCCH transmission includes only one or more particular types of UCI. In some cases, identifying whether the PUCCH resource mapping rule is implicit or explicit may be based at least in part on an amount of uplink control data to be included in the subsequent PUCCH transmission and/or a number of uplink transmission resources in a set, which includes uplink transmission resources having a PUCCH format compatible with the amount of uplink control data to be included in the subsequent PUCCH transmission. In such cases, an explicit resource mapping rule may be used if the amount of uplink control data is above a threshold amount (e.g., a 2-bit UCI payload) and the amount of uplink transmission resources in the set of PUCCH resources having the PUCCH format to be used for the subsequent PUCCH transmission is less than or equal to a threshold amount (e.g., 8) of uplink transmission resources. In some cases, the explicit resource mapping rule may be used if the amount of uplink control data to be included in the subsequent PUCCH transmission is less than or equal to the threshold amount (e.g., a 2-bit UCI payload) and the amount of uplink transmission resources in the set of PUCCH resources having the PUCCH format to be used for the subsequent PUCCH transmission is less than or equal to the threshold amount (e.g., 8) of uplink transmission resources. In some cases, an implicit resource mapping rule may be used if the amount of uplink control data is less than or equal to the threshold amount (e.g., a 2-bit UCI payload) and a number of uplink transmission resources included in a set corressponsive to a PUCCH format to be used for the subsequent PUCCH transmission is greater than the threshold amount (e.g., 8) of uplink transmission resources.

In some cases, identifying the TTI mapping rule based on the PUCCH resource mapping rule includes identifying an implicit TTI mapping rule if the PUCCH resource mapping rule is an implicit PUCCH resource mapping rule and an explicit uplink transmission time interval mapping rule if the PUCCH resource mapping rule is an explicit PUCCH resource mapping rule. Identifying the TTI mapping rule based on the PUCCH resource mapping rule may also include identifying an implicit TTI mapping rule after if the PUCCH resource mapping rule is explicit or identifying an explicit TTI mapping rule if the PUCCH resource mapping rule is implicit. The implicit TTI mapping rule may include applying an offset relative to a current TTI used for a current PUCCH transmission.

PUCCH resource manager 835 may determine an uplink transmission resource to be used for the subsequent PUCCH transmission based on the PUCCH resource mapping rule and determine a TTI in which the uplink transmission resource is to be used for the subsequent PUCCH transmission based on the TTI mapping rule. In some cases, the uplink transmission resource to be used for the subsequent PUCCH transmission includes one or more of a starting symbol, a symbol range within an uplink transmission time interval, one or more resource blocks, a cyclic shift, or an orthogonal cover code. In some cases, the uplink transmission resource includes resources within more than one TTI. In some cases, the uplink transmission resource includes more than one set of resources within one TTI.

Transmitter 820 may transmit signals generated by other components of the device. In some examples, transmitter 820 may be collocated with receiver 810 in a transceiver module. For example, transmitter 820 may be an example of aspects of the transceiver 935 described with reference to FIG. 9. Transmitter 820 may utilize a single antenna or a set of antennas.

Figure 9:
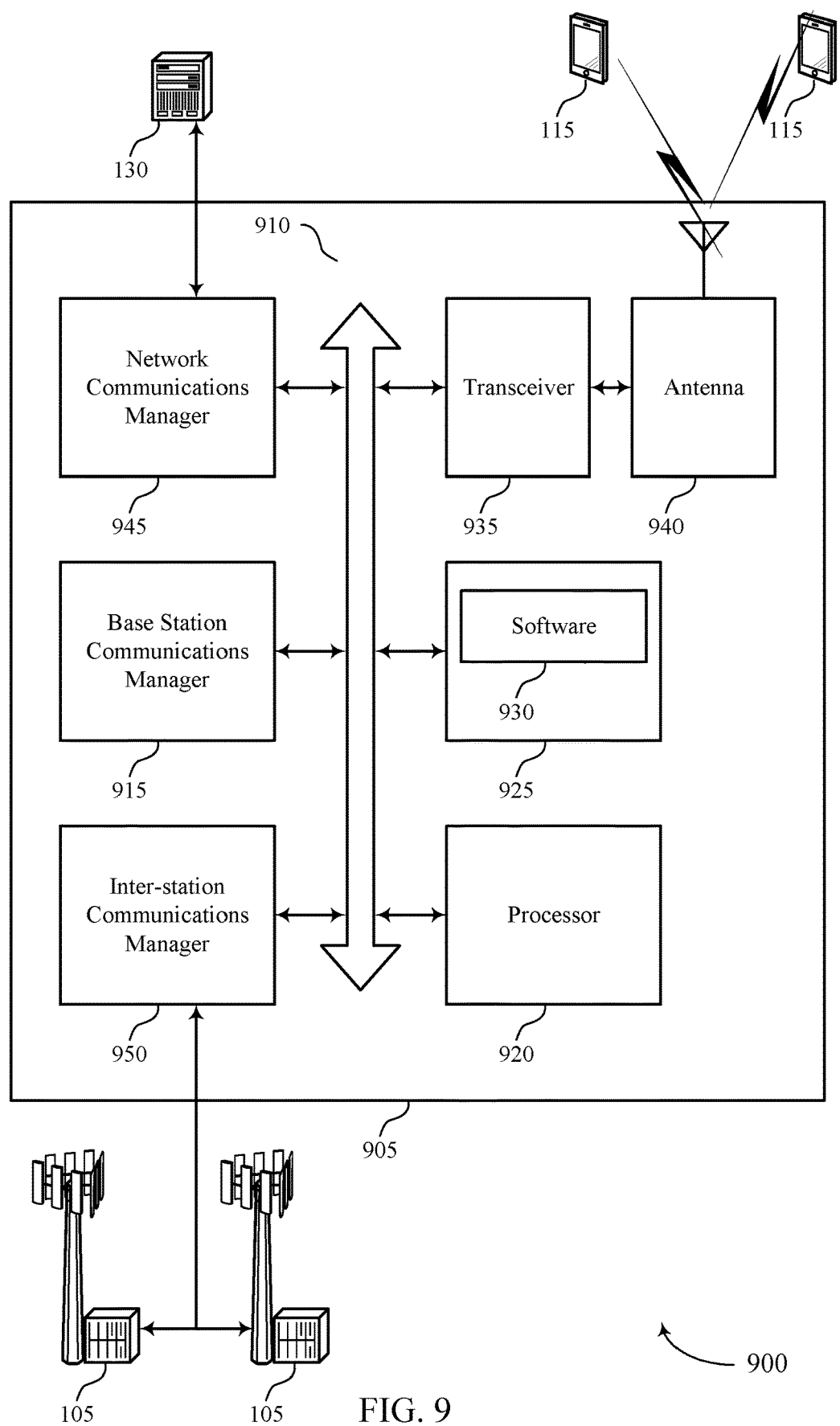
FIG. 9 illustrates a block diagram of a system including a base station that supports uplink control channel resource definition and mapping to user equipment in accordance with aspects of the present disclosure.

FIG. 9 shows a diagram of a system 900 including a device 905 that supports uplink control channel resource definition and mapping to user equipment in accordance with aspects of the present disclosure. Device 905 may be an example of or include the components of wireless device 705, wireless device 805, or a base station 105 as described above, e.g., with reference to FIGS. 7 and 8. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting uplink control channel resource definition and mapping to user equipment).

Memory 925 may include random access memory (RAM) and read only memory (ROM). Memory 925 may store computer-readable, computer-executable software 930 including instructions that, when executed, cause the processor to perform various functions described herein. In some cases, memory 925 may contain, among other things, a basic input/output system (BIOS) which may control basic hardware or software operation such as the interaction with peripheral components or devices.

Software 930 may include code to implement aspects of the present disclosure, including code to support uplink control channel resource definition and mapping to user equipment. Software 930 may be stored in a non-transitory computer-readable medium such as system memory or other memory. In some cases, software 930 may not be directly executable by the processor but may cause a computer (e.g., when compiled and executed) to perform functions described herein.

Transceiver 935 may communicate bi-directionally, via one or more antennas, wired, or wireless links as described above. For example, transceiver 935 may represent a wireless transceiver and may communicate bi-directionally with another wireless transceiver. Transceiver 935 may also include a modem to modulate the packets and provide the modulated packets to the antennas for transmission, and to demodulate packets received from the antennas.

In some cases, the wireless device may include a single antenna 940. However, in some cases the device 905 may have more than one antenna 940, which may be capable of concurrently transmitting or receiving multiple wireless transmissions.

Network communications manager 945 may manage communications with the core network (e.g., via one or more wired backhaul links). For example, network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
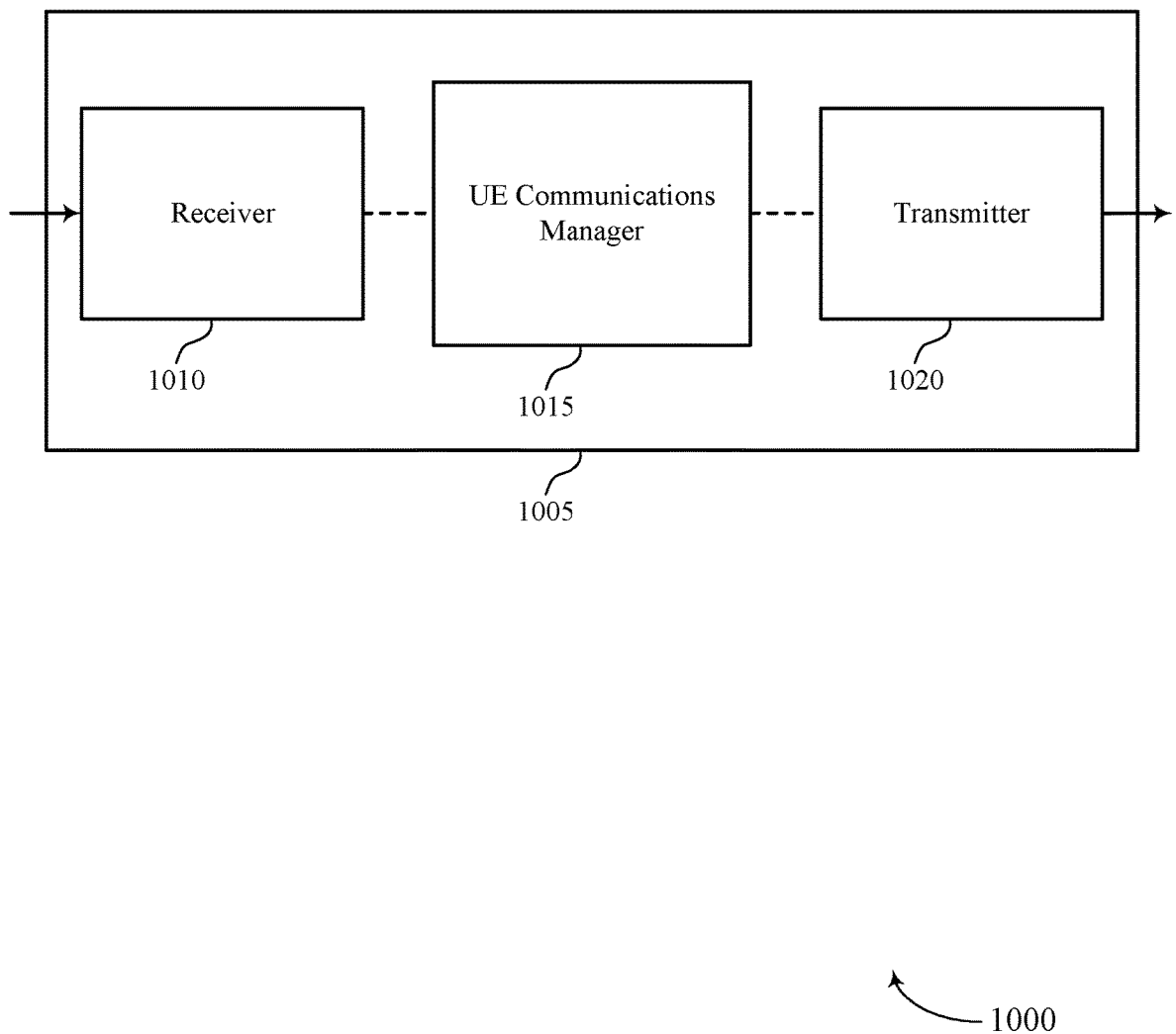
FIGS. 10 through 11 show block diagrams of a device that supports uplink control channel resource definition and mapping to user equipment in accordance with aspects of the present disclosure.

FIG. 10 shows a block diagram 1000 of a wireless device 1005 that supports uplink control channel resource definition and mapping to user equipment in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink control channel resource definition and mapping to user equipment, etc.). Information may be passed on to other components of the device. Receiver 1010 may be an example of aspects of transceiver 1235 described with reference to FIG. 12. Receiver 1010 may utilize a single antenna or a set of antennas.

Receiver 1010 may receive a signal indicative of an uplink transmission resource to be used for the subsequent PUCCH transmission, receive within the signal indicative of the uplink transmission resource an explicit indication of the uplink transmission resource to be used for the subsequent PUCCH transmission, and receive an explicit indication of the TTI. In some cases, the explicit indication of the uplink transmission resource to be used for the subsequent PUCCH transmission includes an index representative of the uplink transmission resource. In some cases, the explicit indication of the TTI includes an index representative of an offset relative to a current TTI used for a current PUCCH transmission.

UE communications manager 1015 may be an example of aspects of UE communications manager 1215 described with reference to FIG. 12.

UE communications manager 1015 and/or at least some of its various sub-components may be implemented in hardware, software executed by a processor, firmware, or any combination thereof. If implemented in software executed by a processor, the functions of UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may identify a PUCCH format to be used for a subsequent PUCCH transmission, identify a PUCCH resource mapping rule based on the PUCCH format, and determine the uplink transmission resource to be used for the subsequent PUCCH transmission based on the PUCCH resource mapping rule.

Transmitter 1020 may transmit signals generated by other components of the device. In some examples, transmitter 1020 may be collocated with receiver 1010 in a transceiver module. For example, transmitter 1020 may be an example of aspects of transceiver 1235 described with reference to FIG. 12. Transmitter 1020 may utilize a single antenna or a set of antennas.

Transmitter 1020 may transmit the subsequent PUCCH transmission via the uplink transmission resource and transmit the subsequent PUCCH transmission within the TTI.

Figure 11:
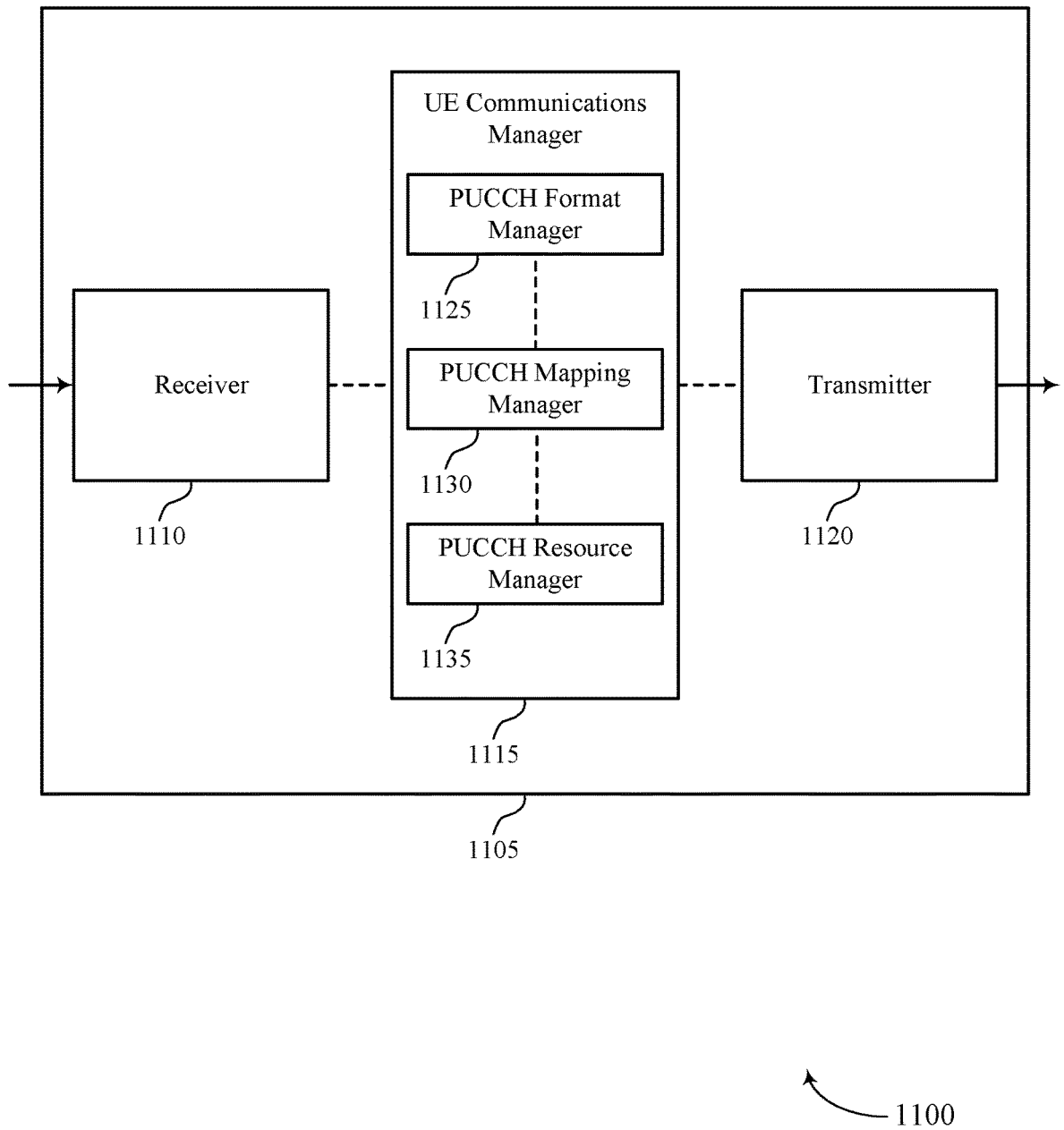

FIG. 11 shows a block diagram 1100 of a wireless device 1105 that supports uplink control channel resource definition and mapping to user equipment in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may communicate, directly or indirectly, with one another (e.g., via one or more buses).

Receiver 1110 may receive information such as packets, user data, or control information associated with various information channels (e.g., control channels, data channels, and information related to uplink control channel resource definition and mapping to user equipment, etc.). Information may be passed on to other components of the device. Receiver 1110 may be an example of aspects of transceiver 1235 described with reference to FIG. 12. Receiver 1110 may utilize a single antenna or a set of antennas.

UE communications manager 1115 may be an example of aspects of UE communications manager 1215 described with reference to FIG. 12.

UE communications manager 1115 may also include PUCCH format manager 1125, PUCCH mapping manager 1130, and PUCCH resource manager 1135.

PUCCH format manager 1125 may identify a PUCCH format to be used for a subsequent PUCCH transmission, which may include identifying the PUCCH format to be used for the subsequent PUCCH transmission includes identifying an amount or a type of uplink control data to be included in the subsequent PUCCH transmission. Identifying the PUCCH format to be used for the subsequent PUCCH transmission may also include determining whether the PUCCH format is a short PUCCH format or a long PUCCH format.

PUCCH mapping manager 1130 may identify a PUCCH resource mapping rule based on the PUCCH format and may also identify a TTI mapping rule based on the PUCCH resource mapping rule. In some cases, identifying the PUCCH resource mapping rule based on the PUCCH format includes identifying an implicit resource mapping rule if the amount of uplink control data to be included in the subsequent PUCCH transmission is below a threshold amount. Identifying the PUCCH resource mapping rule based on the PUCCH format may also include identifying an explicit resource mapping rule if the amount of uplink control data to be included in the subsequent PUCCH transmission is above a threshold amount (e.g., a 2-bit UCI payload).

Identifying the PUCCH resource mapping rule based on the PUCCH format may also include identifying an implicit resource mapping rule if the uplink control data to be included in the subsequent PUCCH transmission includes only one or more particular types of UCI. In some cases, identifying the PUCCH resource mapping rule based on the PUCCH format may include identifying an implicit resource mapping rule if the amount of uplink control data to be included in the subsequent PUCCH transmission is less than or equal to a threshold amount (e.g., a 2-bit UCI payload). Identifying the PUCCH resource mapping rule based on the PUCCH format may also include identifying an implicit resource mapping rule if the uplink control data to be included in the subsequent PUCCH transmission includes only one or more particular types of UCI. In some cases, identifying whether the PUCCH resource mapping rule is implicit or explicit may be based at least in part on an amount of uplink control data to be included in the subsequent PUCCH transmission and/or a number of uplink transmission resources in a set, which includes uplink transmission resources having a PUCCH format compatible with the amount of uplink control data to be included in the subsequent PUCCH transmission. In such cases, the explicit resource mapping rule may be used if the amount of uplink control data is above a threshold amount (e.g., a 2-bit UCI payload) and the amount of uplink transmission resources in the set of PUCCH resources having the PUCCH format to be used for the subsequent PUCCH transmission is less than or equal to a threshold amount (e.g., 8) of uplink transmission resources. In some cases, the explicit resource mapping rule may be used if the amount of uplink control data is less than or equal to the threshold amount (e.g., a 2-bit UCI payload) and the amount of uplink transmission resources in the set of PUCCH resources having the PUCCH format to be used for the subsequent PUCCH transmission is less than or equal to the threshold number (e.g., 8) of uplink transmission resources. In some cases, the implicit resource mapping rule may be used if the amount of uplink control data is less than or equal to the threshold amount (e.g., a 2-bit UCI payload) and the amount of uplink transmission resources in the set of PUCCH resources having the PUCCH format to be used for the subsequent PUCCH transmission is greater than the threshold amount (e.g., 8) of uplink transmission resources.

In some cases, identifying the TTI mapping rule based on the PUCCH resource mapping rule may include identifying an implicit TTI mapping rule if the PUCCH resource mapping rule is an implicit PUCCH resource mapping rule. Identifying the TTI mapping rule based on the PUCCH resource mapping rule may also include identifying an implicit TTI mapping rule after if the PUCCH resource mapping rule is explicit or identifying an explicit TTI mapping rule if the PUCCH resource mapping rule is implicit. The implicit TTI mapping rule may include applying an offset relative to a current TTI used for a current PUCCH transmission. Identifying the TTI mapping rule based on the PUCCH resource mapping rule may also include identifying an explicit TTI mapping rule if the PUCCH resource mapping rule is an explicit PUCCH resource mapping rule.

PUCCH resource manager 1135 may determine the uplink transmission resource to be used for the subsequent PUCCH transmission based on the PUCCH resource mapping rule and determine a TTI in which a TTI in which the uplink transmission resource is to be used for the subsequent PUCCH transmission based on the TTI mapping rule. In some cases, the uplink transmission resource to be used for the subsequent PUCCH transmission includes one or more of a starting symbol, a symbol range within an uplink transmission time interval, one or more resource blocks, a cyclic shift, or an orthogonal cover code. In some cases, the uplink transmission resource includes resources within more than one TTI. In some cases, the uplink transmission resource includes more than one set of resources within one TTI.

Transmitter 1120 may transmit signals generated by other components of the device. In some examples, transmitter 1120 may be collocated with receiver 1110 in a transceiver module. For example, transmitter 1120 may be an example of aspects of transceiver 1235 described with reference to FIG. 12. Transmitter 1120 may utilize a single antenna or a set of antennas.

Figure 12:
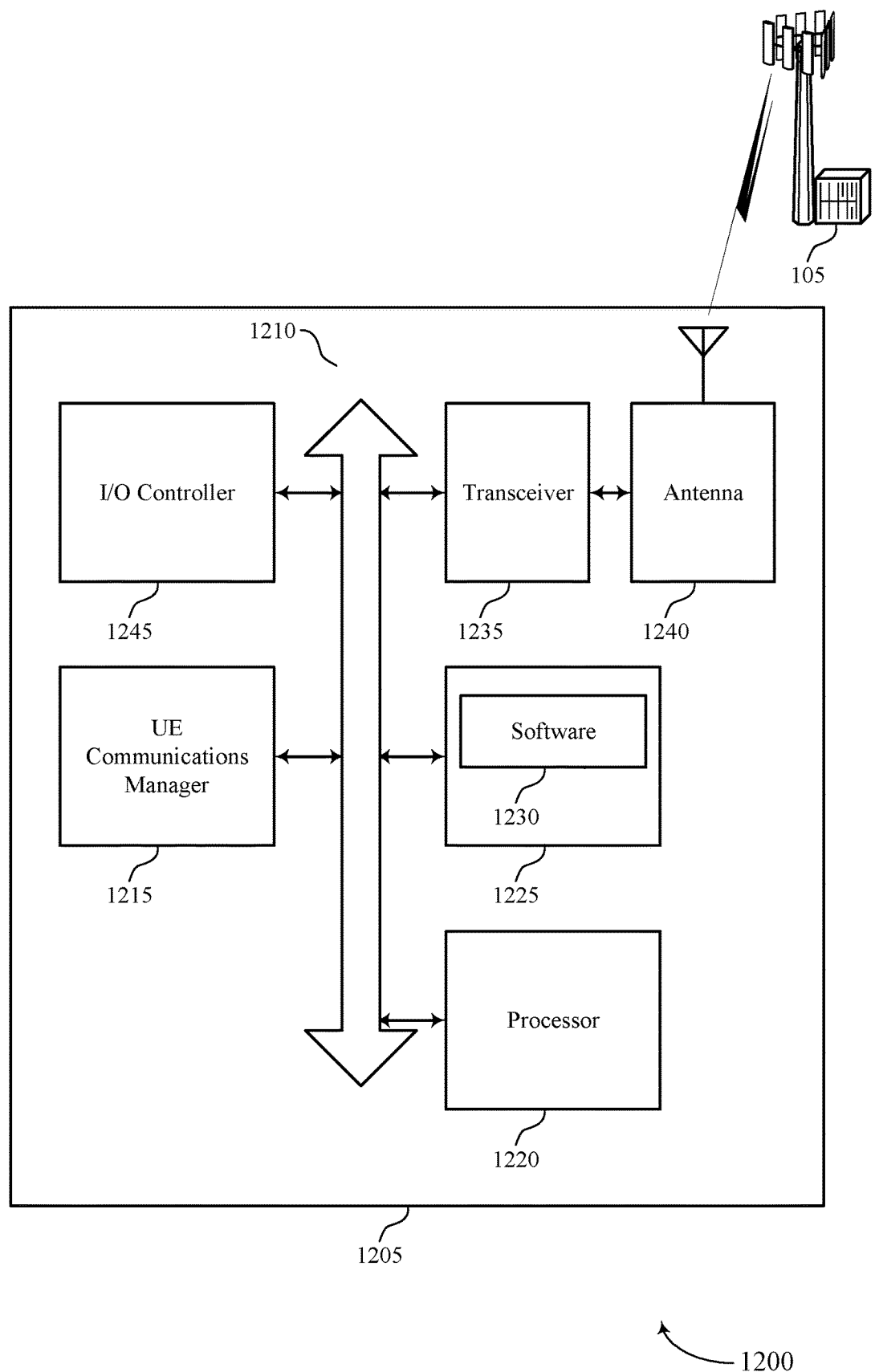
FIG. 12 illustrates a block diagram of a system including a user equipment that supports uplink control channel resource definition and mapping to user equipment in accordance with aspects of the present disclosure.

FIG. 12 shows a diagram of a system 1200 including a device 1205 that supports uplink control channel resource definition and mapping to user equipment in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink control channel resource definition and mapping to user equipment).

Memory 1225 may include RAM and ROM. The memory 1225 may store computer-readable, computer-executable software 1230 including instructions that, when executed, cause the processor to perform various functions described herein. In some cases, memory 1225 may contain, among other things, a BIOS which may control basic hardware or software operation such as the interaction with peripheral components or devices.

Software 1230 may include code to implement aspects of the present disclosure, including code to support uplink control channel resource definition and mapping to user equipment. Software 1230 may be stored in a non-transitory computer-readable medium such as system memory or other memory. In some cases, software 1230 may not be directly executable by the processor but may cause a computer (e.g., when compiled and executed) to perform functions described herein.

Transceiver 1235 may communicate bi-directionally, via one or more antennas, wired, or wireless links as described above. For example, transceiver 1235 may represent a wireless transceiver and may communicate bi-directionally with another wireless transceiver. Transceiver 1235 may also include a modem to modulate the packets and provide the modulated packets to the antennas for transmission, and to demodulate packets received from the antennas.

In some cases, the wireless device 1205 may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
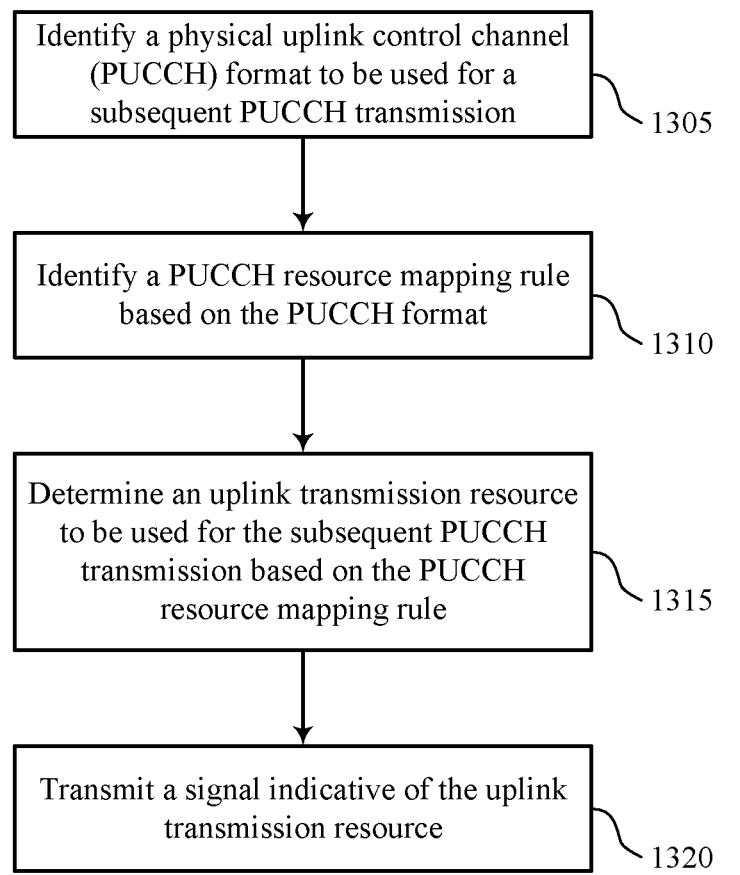
FIGS. 13 through 18 illustrate methods for uplink control channel resource definition and mapping to user equipment in accordance with aspects of the present disclosure.

FIG. 13 shows a flowchart illustrating a method 1300 for uplink control channel resource definition and mapping to user equipment in accordance with aspects of the present disclosure. The operations of method 1300 may be implemented by a base station 105 or its components as described herein. For example, the operations of method 1300 may be performed by a base station communications manager as described with reference to FIGS. 7 through 9. In some examples, a base station 105 may execute a set of codes to control the functional elements of the device to perform the functions described below. Additionally or alternatively, the base station 105 may perform aspects of the functions described below using special-purpose hardware.

At block 1305, the base station 105 may identify a physical uplink control channel (PUCCH) format to be used for a subsequent PUCCH transmission. The operations of block 1305 may be performed according to the methods described herein. In certain examples, aspects of the operations of block 1305 may be performed by a PUCCH format manager as described with reference to FIGS. 7 through 9.

At block 1310, the base station 105 may identify a PUCCH resource mapping rule based at least in part on the PUCCH format. The operations of block 1310 may be performed according to the methods described herein. In certain examples, aspects of the operations of block 1310 may be performed by a PUCCH mapping manager as described with reference to FIGS. 7 through 9.

At block 1315, the base station 105 may determine an uplink transmission resource to be used for the subsequent PUCCH transmission based at least in part on the PUCCH resource mapping rule. The operations of block 1315 may be performed according to the methods described herein. In certain examples, aspects of the operations of block 1315 may be performed by a PUCCH resource manager as described with reference to FIGS. 7 through 9.

At block 1320, the base station 105 may transmit a signal indicative of the uplink transmission resource. The operations of block 1320 may be performed according to the methods described herein. In certain examples, aspects of the operations of block 1320 may be performed by a transmitter as described with reference to FIGS. 7 through 9.

Figure 14:
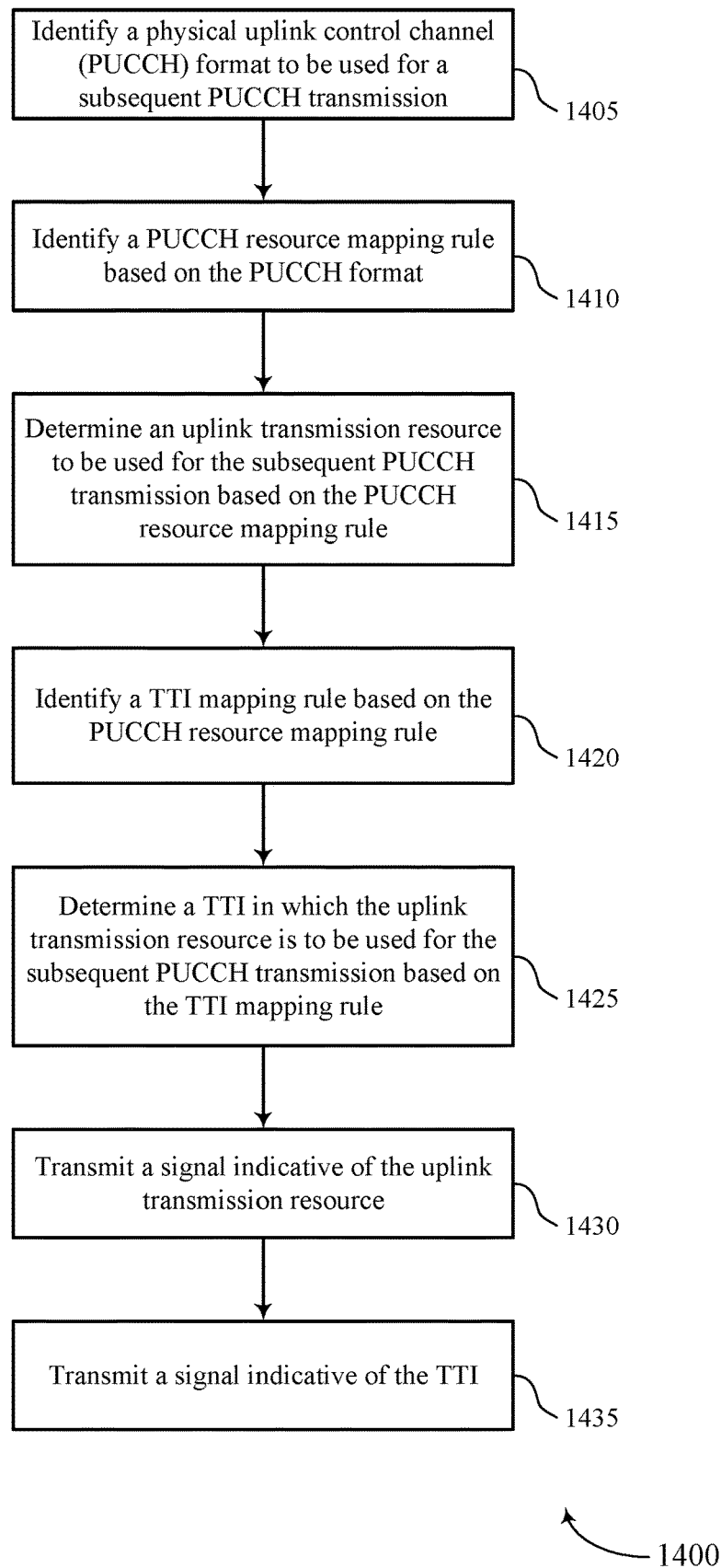

FIG. 14 shows a flowchart illustrating a method 1400 for uplink control channel resource definition and mapping to user equipment in accordance with aspects of the present disclosure. The operations of method 1400 may be implemented by a base station 105 or its components as described herein. For example, the operations of method 1400 may be performed by a base station communications manager as described with reference to FIGS. 7 through 9. In some examples, a base station 105 may execute a set of codes to control the functional elements of the device to perform the functions described below. Additionally or alternatively, the base station 105 may perform aspects of the functions described below using special-purpose hardware.

At block 1405, the base station 105 may identify a physical uplink control channel (PUCCH) format to be used for a subsequent PUCCH transmission. The operations of block 1405 may be performed according to the methods described herein. In certain examples, aspects of the operations of block 1405 may be performed by a PUCCH format manager as described with reference to FIGS. 7 through 9.

At block 1410, the base station 105 may identify a PUCCH resource mapping rule based at least in part on the PUCCH format. The operations of block 1410 may be performed according to the methods described herein. In certain examples, aspects of the operations of block 1410 may be performed by a PUCCH mapping manager as described with reference to FIGS. 7 through 9.

At block 1415, the base station 105 may determine an uplink transmission resource to be used for the subsequent PUCCH transmission based at least in part on the PUCCH resource mapping rule. The operations of block 1415 may be performed according to the methods described herein. In certain examples, aspects of the operations of block 1415 may be performed by a PUCCH resource manager as described with reference to FIGS. 7 through 9.

At block 1420, the base station 105 may identify a transmission time interval (TTI) mapping rule based at least in part on the PUCCH resource mapping rule. The operations of block 1420 may be performed according to the methods described herein. In certain examples, aspects of the operations of block 1420 may be performed by a PUCCH mapping manager as described with reference to FIGS. 7 through 9.

At block 1425, the base station 105 may determine a TTI in which the uplink transmission resource is to be used for the subsequent PUCCH transmission based at least in part on the TTI mapping rule. The operations of block 1425 may be performed according to the methods described herein. In certain examples, aspects of the operations of block 1425 may be performed by a PUCCH resource manager as described with reference to FIGS. 7 through 9.

At block 1430 the base station 105 may transmit a signal indicative of the uplink transmission resource. The operations of block 1430 may be performed according to the methods described herein. In certain examples, aspects of the operations of block 1430 may be performed by a transmitter as described with reference to FIGS. 7 through 9.

At block 1435, the base station 105 may transmit a signal indicative of the TTI. The operations of block 1435 may be performed according to the methods described herein. In certain examples, aspects of the operations of block 1435 may be performed by a transmitter as described with reference to FIGS. 7 through 9. In some cases, the base station 105 may transmit a single signal that is indicative of both the uplink transmission resource and the TTI.

Figure 15:
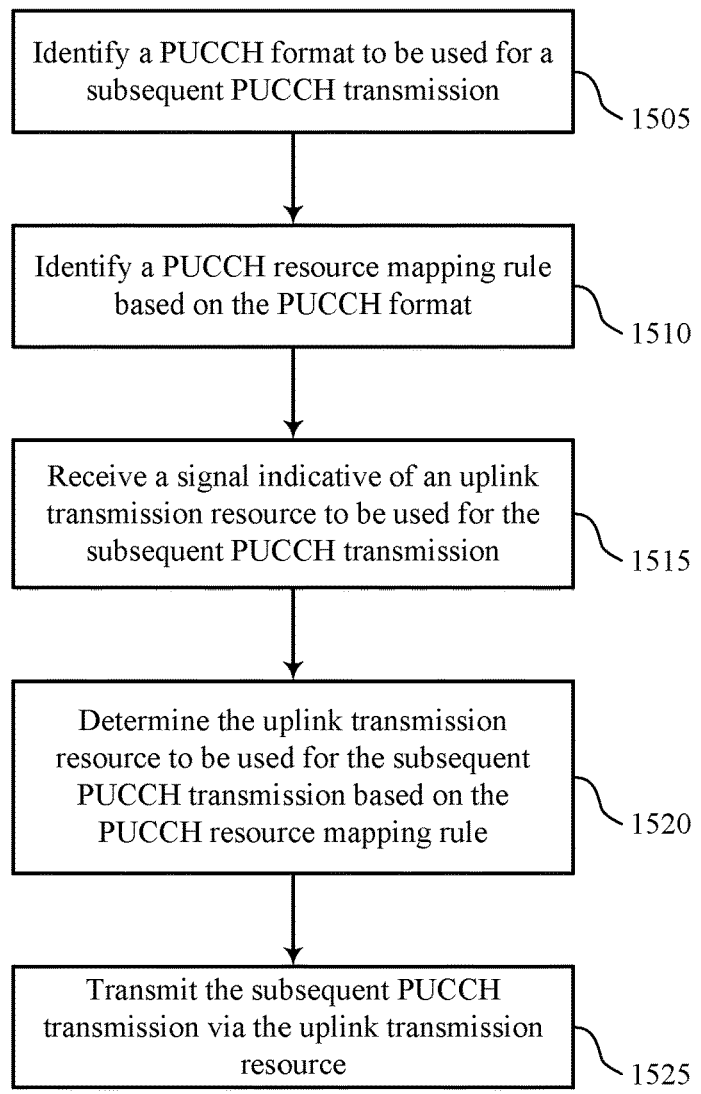

FIG. 15 shows a flowchart illustrating a method 1500 for uplink control channel resource definition and mapping to user equipment in accordance with aspects of the present disclosure. The operations of method 1500 may be implemented by a UE 115 or its components as described herein. For example, the operations of method 1500 may be performed by UE communications manager 1015, 1115, and 1215 as described with reference to FIGS. 10 through 12. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may identify a physical uplink control channel (PUCCH) format to be used for a subsequent PUCCH transmission. The operations of block 1505 may be performed according to the methods described herein. In certain examples, aspects of the operations of block 1505 may be performed by a PUCCH format manager as described with reference to FIGS. 10 through 12.

At block 1510, the UE 115 may identify a PUCCH resource mapping rule based at least in part on the PUCCH format. The operations of block 1510 may be performed according to the methods described herein. In certain examples, aspects of the operations of block 1510 may be performed by a PUCCH mapping manager as described with reference to FIGS. 10 through 12.

At block 1515, the UE 115 may receive a signal indicative of an uplink transmission resource to be used for the subsequent PUCCH transmission. The operations of block 1515 may be performed according to the methods described herein. In certain examples, aspects of the operations of block 1515 may be performed by a receiver as described with reference to FIGS. 10 through 12.

At block 1520, the UE 115 may determine the uplink transmission resource to be used for the subsequent PUCCH transmission based at least in part on the PUCCH resource mapping rule. The operations of block 1520 may be performed according to the methods described herein. In certain examples, aspects of the operations of block 1520 may be performed by a PUCCH resource manager as described with reference to FIGS. 10 through 12.

At block 1525, the UE 115 may transmit the subsequent PUCCH transmission via the uplink transmission resource. The operations of block 1525 may be performed according to the methods described herein. In certain examples, aspects of the operations of block 1525 may be performed by a transmitter as described with reference to FIGS. 10 through 12.

Figure 16:
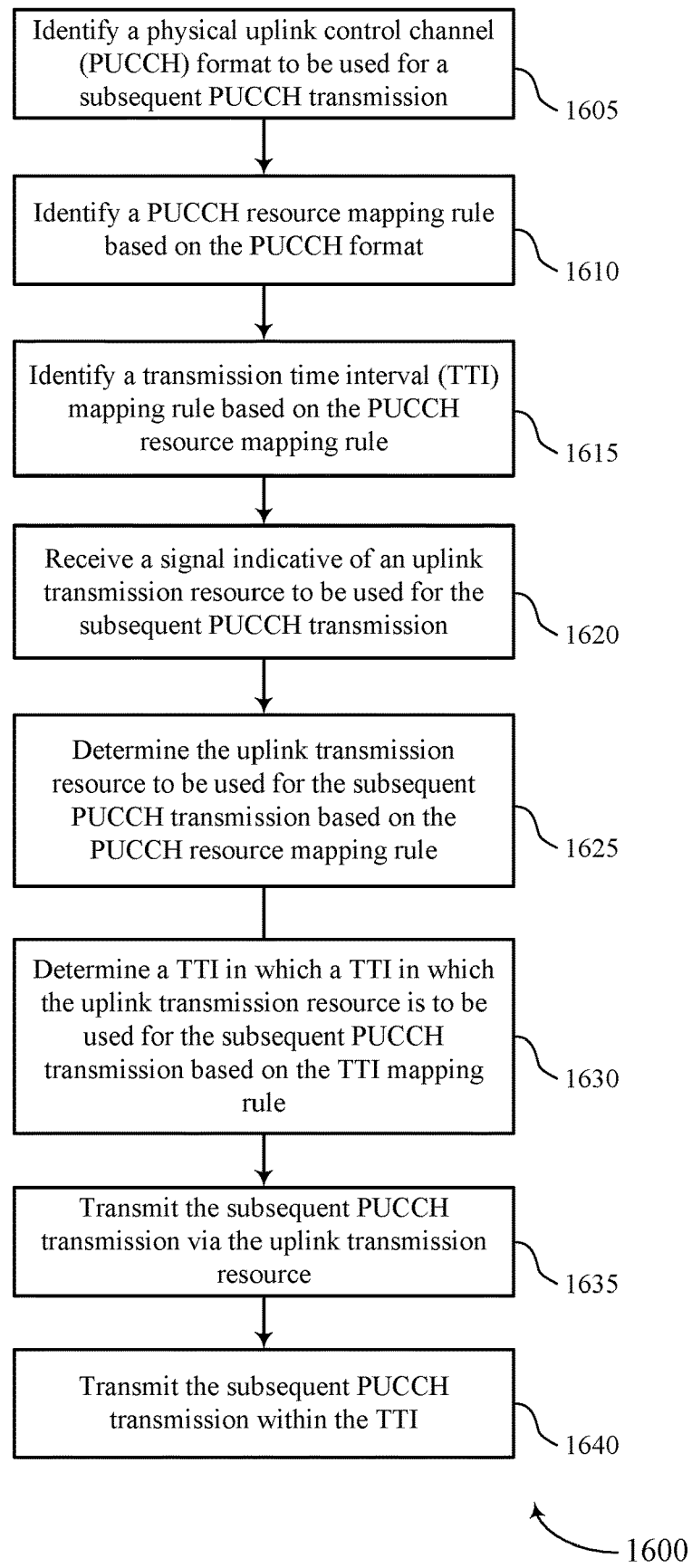

FIG. 16 shows a flowchart illustrating a method 1600 for uplink control channel resource definition and mapping to user equipment in accordance with aspects of the present disclosure. The operations of method 1600 may be implemented by a UE 115 or its components as described herein. For example, the operations of method 1600 may be performed by UE communications manager 1015, 1115, and 1215 as described with reference to FIGS. 10 through 12. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may identify a physical uplink control channel (PUCCH) format to be used for a subsequent PUCCH transmission. The operations of block 1605 may be performed according to the methods described herein. In certain examples, aspects of the operations of block 1605 may be performed by a PUCCH format manager as described with reference to FIGS. 10 through 12.

At block 1610, the UE 115 may identify a PUCCH resource mapping rule based at least in part on the PUCCH format. The operations of block 1610 may be performed according to the methods described herein. In certain examples, aspects of the operations of block 1610 may be performed by a PUCCH mapping manager as described with reference to FIGS. 10 through 12.

At block 1615, the UE 115 may identify a transmission time interval (TTI) mapping rule based at least in part on the PUCCH resource mapping rule. The operations of block 1615 may be performed according to the methods described herein. In certain examples, aspects of the operations of block 1615 may be performed by a PUCCH mapping manager as described with reference to FIGS. 10 through 12.

At block 1620, the UE 115 may receive a signal indicative of an uplink transmission resource to be used for the subsequent PUCCH transmission. The operations of block 1620 may be performed according to the methods described herein. In certain examples, aspects of the operations of block 1620 may be performed by a receiver as described with reference to FIGS. 10 through 12. In some cases, the UE 115 may receive a single signal that is indicative of both the uplink transmission resource and the TTI. The UE 115 may also receive separate signals, one indicative of the uplink transmission resource and another indicative of the TTI.

At block 1625, the UE 115 may determine the uplink transmission resource to be used for the subsequent PUCCH transmission based at least in part on the PUCCH resource mapping rule. The operations of block 1625 may be performed according to the methods described herein. In certain examples, aspects of the operations of block 1625 may be performed by a PUCCH resource manager as described with reference to FIGS. 10 through 12.

At block 1630, the UE 115 may determine a TTI in which a TTI in which the uplink transmission resource is to be used for the subsequent PUCCH transmission based at least in part on the TTI mapping rule. The operations of block 1630 may be performed according to the methods described herein. In certain examples, aspects of the operations of block 1630 may be performed by a PUCCH resource manager as described with reference to FIGS. 10 through 12.

At block 1635, the UE 115 may transmit the subsequent PUCCH transmission via the uplink transmission resource. The operations of block 1635 may be performed according to the methods described herein. In certain examples, aspects of the operations of block 1635 may be performed by a transmitter as described with reference to FIGS. 10 through 12.

At block 1640, the UE 115 may transmit the subsequent PUCCH transmission within the TTI. The operations of block 1640 may be performed according to the methods described herein. In certain examples, aspects of the operations of block 1640 may be performed by a transmitter as described with reference to FIGS. 10 through 12. The UE 115 may combine the operations of block 1635 and 1640 such that it accomplishes the operations of block 1635 and 1640 simultaneously.

Figure 17:
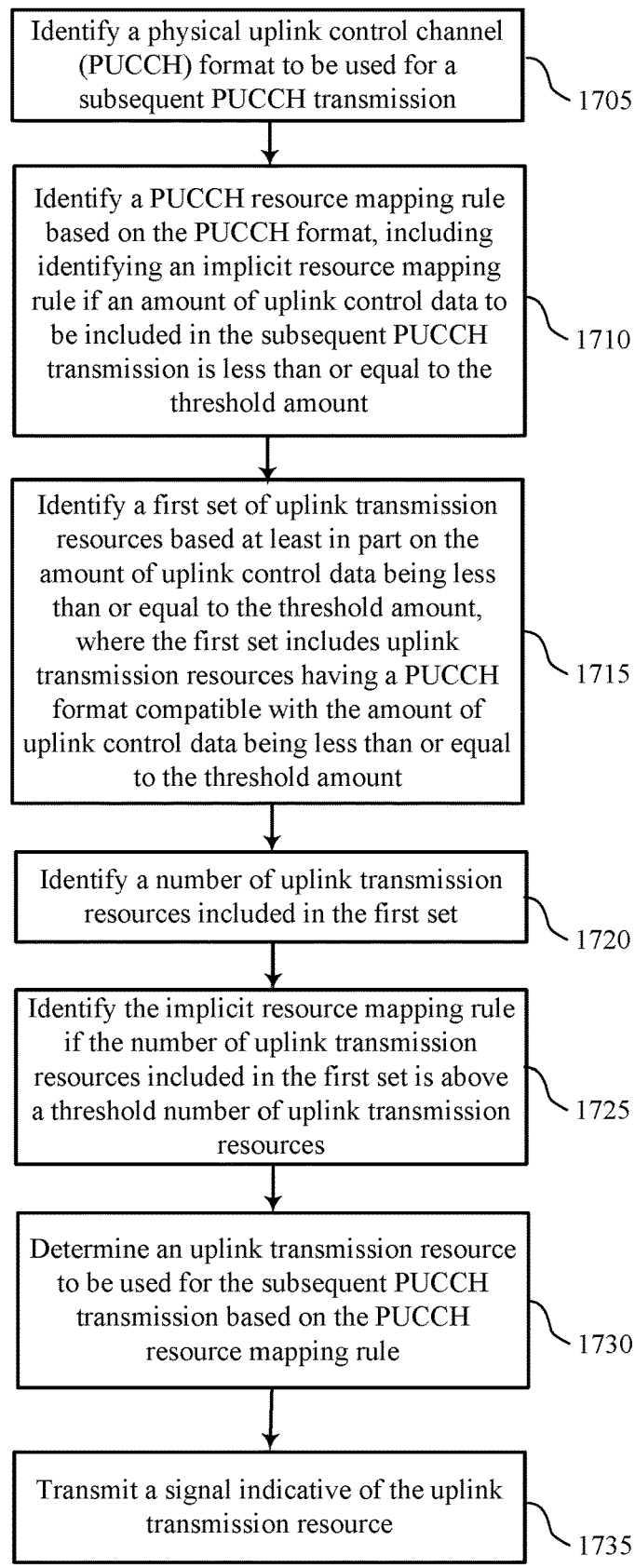

FIG. 17 shows a flowchart illustrating a method 1300 for uplink control channel resource definition and mapping to user equipment in accordance with aspects of the present disclosure. The operations of method 1300 may be implemented by a base station 105 or its components as described herein. For example, the operations of method 1300 may be performed by a base station communications manager as described with reference to FIGS. 7 through 9. In some examples, a base station 105 may execute a set of codes to control the functional elements of the device to perform the functions described below. Additionally or alternatively, the base station 105 may perform aspects of the functions described below using special-purpose hardware.

At block 1705, the base station 105 may identify a physical uplink control channel (PUCCH) format to be used for a subsequent PUCCH transmission. The operations of block 1705 may be performed according to the methods described herein. In certain examples, aspects of the operations of block 1705 may be performed by a PUCCH format manager as described with reference to FIGS. 7 through 9.

At block 1710, the base station 105 may identify a PUCCH resource mapping rule based at least in part on the PUCCH format. The base station 105 may identify an implicit resource mapping rule if an amount of uplink control data to be included in the subsequent PUCCH transmission is less than or equal to the threshold amount. The operations of block 1710 may be performed according to the methods described herein. In certain examples, aspects of the operations of block 1710 may be performed by a PUCCH mapping manager as described with reference to FIGS. 7 through 9.

At block 1715, the base station 105 may identify a first set of uplink transmission resources based at least in part on the amount of uplink control data being less than or equal to the threshold amount, where the first set includes uplink transmission resources having a PUCCH format compatible with the amount of uplink control data being less than or equal to the threshold amount. The operations of block 1715 may be performed according to the methods described herein. In certain examples, aspects of the operations of block 1715 may be performed by a PUCCH mapping manager as described with reference to FIGS. 7 through 9.

At block 1720, the base station 105 may identify a number of uplink transmission resources included in the first set. The operations of block 1715 may be performed according to the methods described herein. In certain examples, aspects of the operations of block 1715 may be performed by a PUCCH resource manager as described with reference to FIGS. 7 through 9.

At block 1725, the base station may identify the implicit resource mapping rule if the number of uplink transmission resources included in the first set is above a threshold number of uplink transmission resources. The operations of block 1715 may be performed according to the methods described herein. In certain examples, aspects of the operations of block 1715 may be performed by a PUCCH mapping manager as described with reference to FIGS. 7 through 9.

At block 1730, the base station 105 may determine an uplink transmission resource to be used for the subsequent PUCCH transmission based at least in part on the PUCCH resource mapping rule. The operations of block 1730 may be performed according to the methods described herein. In certain examples, aspects of the operations of block 1730 may be performed by a PUCCH resource manager as described with reference to FIGS. 7 through 9.

At block 1735, the base station 105 may transmit a signal indicative of the uplink transmission resource. The operations of block 1735 may be performed according to the methods described herein. In certain examples, aspects of the operations of block 1735 may be performed by a transmitter as described with reference to FIGS. 7 through 9.

Figure 18:
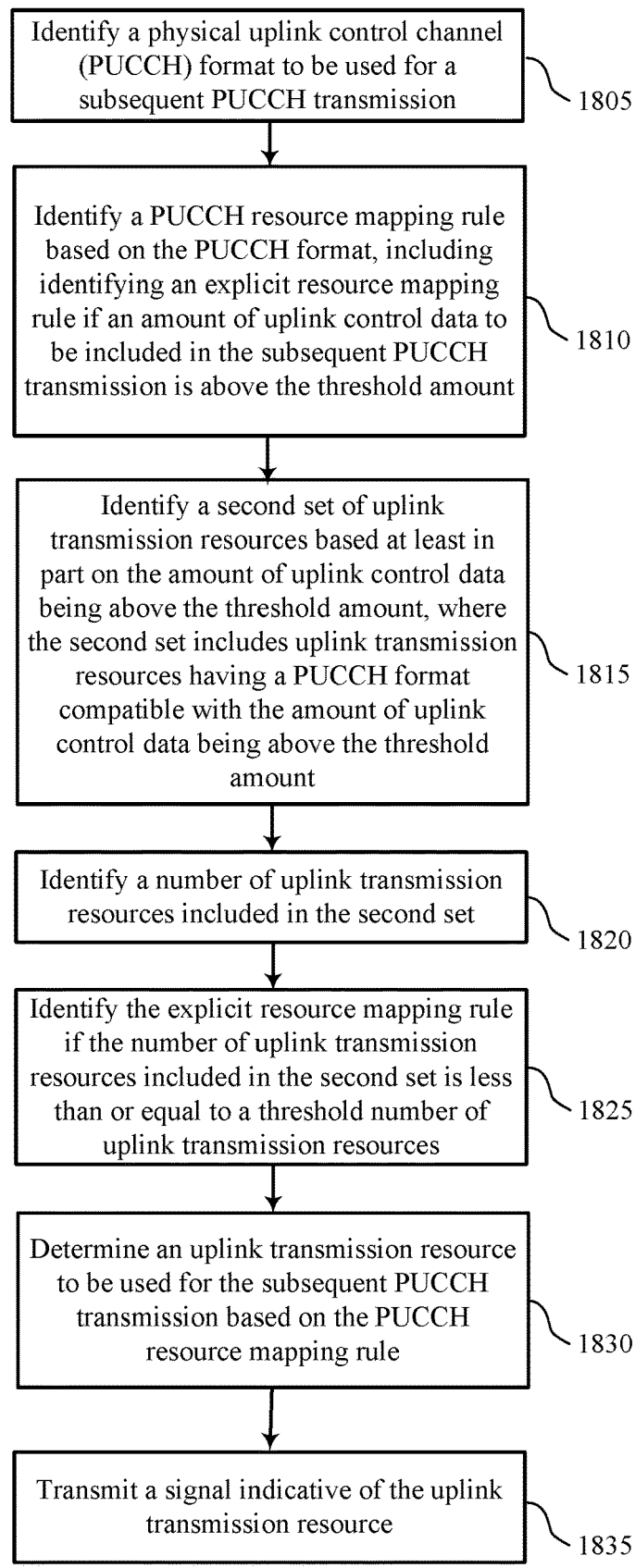

FIG. 18 shows a flowchart illustrating a method 1800 for uplink control channel resource definition and mapping to user equipment in accordance with aspects of the present disclosure. The operations of method 1800 may be implemented by a base station 105 or its components as described herein. For example, the operations of method 1800 may be performed by a base station communications manager as described with reference to FIGS. 7 through 9. In some examples, a base station 105 may execute a set of codes to control the functional elements of the device to perform the functions described below. Additionally or alternatively, the base station 105 may perform aspects of the functions described below using special-purpose hardware.

At block 1805, the base station 105 may identify a physical uplink control channel (PUCCH) format to be used for a subsequent PUCCH transmission. The operations of block 1805 may be performed according to the methods described herein. In certain examples, aspects of the operations of block 1805 may be performed by a PUCCH format manager as described with reference to FIGS. 7 through 9.

At block 1810, the base station 105 may identify a PUCCH resource mapping rule based at least in part on the PUCCH format. The base station 105 may identify an explicit resource mapping rule if an amount of uplink control data to be included in the subsequent PUCCH transmission is above the threshold amount. The operations of block 1810 may be performed according to the methods described herein. In certain examples, aspects of the operations of block 1810 may be performed by a PUCCH mapping manager as described with reference to FIGS. 7 through 9.

At block 1815, the base station 105 may identify a second set of uplink transmission resources based at least in part on the amount of uplink control data being above the threshold amount, where the second set includes uplink transmission resources having a PUCCH format compatible with the amount of uplink control data being above the threshold amount. The operations of block 1815 may be performed according to the methods described herein. In certain examples, aspects of the operations of block 1815 may be performed by a PUCCH resource manager as described with reference to FIGS. 7 through 9.

At block 1820, the base station 105 may identify a number of uplink transmission resources included in the second set. The operations of block 1820 may be performed according to the methods described herein. In certain examples, aspects of the operations of block 1820 may be performed by a PUCCH resource manager as described with reference to FIGS. 7 through 9.

At block 1825, the base station 105 may identify the explicit resource mapping rule if the number of uplink transmission resources included in the second set is less than or equal to a threshold number of uplink transmission resources. The operations of block 1825 may be performed according to the methods described herein. In certain examples, aspects of the operations of block 1825 may be performed by a PUCCH mapping as described with reference to FIGS. 7 through 9.

At block 1830, the base station 105 may determine an uplink transmission resource to be used for the subsequent PUCCH transmission based at least in part on the PUCCH resource mapping rule. The operations of block 1830 may be performed according to the methods described herein. In certain examples, aspects of the operations of block 1830 may be performed by a PUCCH resource manager as described with reference to FIGS. 7 through 9.

At block 1835, the base station 105 may transmit a signal indicative of the uplink transmission resource. The operations of block 1835 may be performed according to the methods described herein. In certain examples, aspects of the operations of block 1835 may be performed by a transmitter as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    identifying a plurality of indices for a plurality of physical uplink control channel (PUCCH) resources, each index of the plurality of indices associated with a respective PUCCH resource that has a corresponding starting symbol and duration;
    identifying a PUCCH resource mapping rule based at least in part on an amount of uplink control information for a PUCCH transmission from a user equipment (UE);
    determining, from among the plurality of PUCCH resources, a PUCCH resource for the PUCCH transmission based at least in part on using the PUCCH resource mapping rule to identify a corresponding index of the plurality of indices; and
    receiving the PUCCH transmission via the PUCCH resource.

2. The method of claim 1, further comprising:
    transmitting, to the UE, an indication of the PUCCH resource for the PUCCH transmission, the indication comprising a value associated with the corresponding index of the PUCCH resource.

3. The method of claim 1, wherein identifying the PUCCH resource mapping rule comprises:
    identifying a first resource mapping rule based at least in part on the amount of uplink control information for the PUCCH transmission being less than or equal to a threshold amount.

4. The method of claim 1, wherein identifying the PUCCH resource mapping rule comprises:
    identifying a first set of PUCCH resources from among the plurality of PUCCH resources based at least in part on the amount of uplink control information being less than or equal to a threshold amount; and
    identifying a first resource mapping rule based at least in part on a number of PUCCH resources included in the first set being above a threshold number of PUCCH resources.

5. The method of claim 4, wherein the threshold number of PUCCH resources comprises a maximum number of PUCCH resources identifiable in a downlink control information (DCI) field associated with PUCCH transmissions.

6. The method of claim 4, wherein:
    the first resource mapping rule is different than a second resource mapping rule, the second resource mapping rule for use when the number of PUCCH resources included in the first set is less than or equal to the threshold number of PUCCH resources.

7. The method of claim 1, wherein identifying the PUCCH resource mapping rule comprises:
    identifying a second resource mapping rule based at least in part on the amount of uplink control information for the PUCCH transmission being above a threshold amount.

8. The method of claim 1, wherein identifying the PUCCH resource mapping rule comprises:
    identifying a first set of PUCCH resources from among the plurality of PUCCH resources based at least in part on the amount of uplink control information being less than or equal to a threshold amount;
    identifying a second resource mapping rule based at least in part on a number of PUCCH resources included in the first set being less than or equal to a threshold number of PUCCH resources.

9. The method of claim 8, wherein the threshold number of PUCCH resources comprises a maximum number of PUCCH resources identifiable in a downlink control information (DCI) field associated with PUCCH transmission.

10. The method of claim 1, wherein:
    the PUCCH resource for the PUCCH transmission further comprises one or more of, a cyclic shift, one or more resource blocks, or an orthogonal cover code.

11. The method of claim 1, further comprising:
    identifying a transmission time interval (TTI) mapping rule based at least in part on the PUCCH resource mapping rule;
    determining a TTI in which the PUCCH resource is to be used for the PUCCH transmission based at least in part on the TTI mapping rule; and
    transmitting a signal indicative of the TTI.

12. The method of claim 11, further comprising:
    including in the signal indicative of the TTI an explicit indication of the TTI, wherein the explicit indication of the TTI comprises an index representative of an offset relative to a current TTI used for a current PUCCH transmission.

13. The method of claim 11, wherein identifying the TTI mapping rule based at least in part on the PUCCH resource mapping rule comprises:
identifying an implicit TTI mapping rule when the PUCCH resource mapping rule is a first resource mapping rule.

14. The method of claim 13, wherein:
the implicit TTI mapping rule comprises applying an offset relative to a current TTI used for a current PUCCH transmission.

15. The method of claim 11, wherein identifying the TTI mapping rule based at least in part on the PUCCH resource mapping rule comprises:
identifying an explicit TTI mapping rule when the PUCCH resource mapping rule is a second resource mapping rule.

16. The method of claim 11, wherein identifying the TTI mapping rule based at least in part on the PUCCH resource mapping rule comprises:
identifying an implicit uplink TTI mapping rule when the PUCCH resource mapping rule is a second resource mapping rule.

17. The method of claim 11, wherein identifying the TTI mapping rule based at least in part on the PUCCH resource mapping rule comprises:
identifying an explicit TTI mapping rule when the PUCCH resource mapping rule is a first resource mapping rule.

18. The method of claim 1, wherein:
the PUCCH resource comprises resources within more than one transmission time interval (TTI).

19. The method of claim 1, wherein:
the PUCCH resource comprises more than one set of resources within one transmission time interval (TTI).

20. The method of claim 1, wherein identifying the PUCCH resource mapping rule comprises:
identifying a first set of PUCCH resources from among the plurality of PUCCH resources based at least in part on the amount of uplink control information being less than or equal to a threshold amount; and
identifying an implicit resource mapping rule based at least in part on a number of PUCCH resources included in the first set being above a threshold number of PUCCH resources.

21. A method for wireless communication at a user equipment (UE), comprising:
identifying a plurality of indices for a plurality of corresponding physical uplink control channel (PUCCH) resources, each index of the plurality of indices associated with a respective PUCCH resource that has a corresponding starting symbol and duration;
identifying a PUCCH resource mapping rule based at least in part on an amount of uplink control information for a PUCCH transmission;
determining, from among the plurality of PUCCH resources, a PUCCH resource for the PUCCH transmission based at least in part on using the PUCCH resource mapping rule to identify a corresponding index of the plurality of indices; and
transmitting the PUCCH transmission via the PUCCH resource.

22. The method of claim 21, further comprising:
receiving an indication of the PUCCH resource for the PUCCH transmission, the indication comprising a value associated with the corresponding index of the PUCCH resource.

23. The method of claim 21, wherein identifying the PUCCH resource mapping rule comprises:
identifying a first resource mapping rule based at least in part on the amount of uplink control information for the PUCCH transmission being below a threshold amount.

24. The method of claim 21, wherein identifying the PUCCH resource mapping rule comprises:
identifying a first set of PUCCH resources from among the plurality of PUCCH resources based at least in part on the amount of uplink control information being less than or equal to a threshold amount; and
identifying a first resource mapping rule based at least in part on a number of PUCCH resources included in the first set being above a threshold number of PUCCH resources.

25. The method of claim 24, wherein the threshold number of PUCCH resources comprises a maximum number of PUCCH resources identifiable in a downlink control information (DCI) field associated with PUCCH transmissions.

26. The method of claim 24, wherein:
the first resource mapping rule is different than a second resource mapping rule, the second resource mapping rule for use when the number of PUCCH resources included in the first set is less than or equal to the threshold number of PUCCH resources.

27. The method of claim 21, wherein identifying the PUCCH resource mapping rule comprises:
identifying a second resource mapping rule based at least in part on the amount of uplink control information for the PUCCH transmission being above a threshold amount.

28. The method of claim 21, wherein identifying the PUCCH resource mapping rule comprises:
identifying a first set of PUCCH resources from among the plurality of PUCCH resources based at least in part on the amount of uplink control information being above a threshold amount; and
identifying a second resource mapping rule based at least in part on a number of PUCCH resources included in the first set being less than or equal to a threshold number of PUCCH resources.

29. The method of claim 28, wherein the threshold number of PUCCH resources comprises a maximum number of PUCCH resources identifiable in a downlink control information (DCI) field associated with PUCCH transmissions.

30. The method of claim 21, wherein:
the PUCCH resource for the PUCCH transmission comprises one or more of a cyclic shift, one or more resource blocks, or an orthogonal cover code.

31. The method of claim 21, further comprising:
identifying a transmission time interval (TTI) mapping rule based at least in part on the PUCCH resource mapping rule;
determining a TTI in which the PUCCH resource is to be used for the PUCCH transmission based at least in part on the TTI mapping rule; and
transmitting the PUCCH transmission within the TTI.

32. The method of claim 31, further comprising:
receiving an explicit indication of the TTI, wherein the explicit indication of the TTI comprises an index representative of an offset relative to a current TTI used for a current PUCCH transmission.

33. The method of claim 31, wherein identifying the TTI mapping rule based at least in part on the PUCCH resource mapping rule comprises:
identifying an implicit TTI mapping rule when the PUCCH resource mapping rule is a first resource mapping rule.

34. The method of claim 33, wherein:
the implicit TTI mapping rule comprises applying an offset relative to a current TTI used for a current PUCCH transmission.

35. The method of claim 31, wherein identifying the TTI mapping rule based at least in part on the PUCCH resource mapping rule comprises:
identifying an explicit TTI mapping rule when the PUCCH resource mapping rule is a second resource mapping rule.

36. The method of claim 31, wherein identifying the TTI mapping rule based at least in part on the PUCCH resource mapping rule comprises:
identifying an explicit TTI mapping rule when the PUCCH resource mapping rule is a first resource mapping rule.

37. The method of claim 31, wherein identifying the TTI mapping rule based at least in part on the PUCCH resource mapping rule comprises:
identifying an implicit TTI mapping rule when the PUCCH resource mapping rule is a second resource mapping rule.

38. The method of claim 21, wherein:
the PUCCH resource comprises resources within more than one TTI.

39. The method of claim 21, wherein:
the PUCCH resource comprises more than one set of resources within one TTI.

40. The method of claim 21, wherein identifying the PUCCH resource mapping rule comprises:
identifying a first set of PUCCH resources from among the plurality of PUCCH resources based at least in part on the amount of uplink control information being less than or equal to a threshold amount; and
identifying an implicit resource mapping rule based at least in part on a number of PUCCH resources included in the first set being above a threshold number of PUCCH resources.

41. An apparatus for wireless communication at a base station, comprising:
means for identifying a plurality of indices for a plurality of physical uplink control channel (PUCCH) resources, each index of the plurality of indices associated with a respective PUCCH resource that has a corresponding starting symbol and duration;
means for identifying a PUCCH resource mapping rule based at least in part on an amount of uplink control information for a PUCCH transmission from a user equipment (UE);
means for determining, from among the plurality of PUCCH resources, a PUCCH resource for the PUCCH transmission based at least in part on using the PUCCH resource mapping rule to identify a corresponding index of the plurality of indices; and
means for receiving the PUCCH transmission via the PUCCH resource.

42. An apparatus for wireless communication at a user equipment (UE), comprising:
means for identifying a plurality of indices for a plurality of physical uplink control channel (PUCCH) resources, each index of the plurality of indices associated with a respective PUCCH resource that has a corresponding starting symbol and duration;
means for identifying a PUCCH resource mapping rule based at least in part on an amount of uplink control information for a PUCCH transmission;
means for determining, from among the plurality of PUCCH resources, a PUCCH resource for the PUCCH transmission based at least in part on using the PUCCH resource mapping rule to identify a corresponding index of the plurality of indices; and
means for transmitting the PUCCH transmission via the PUCCH resource.

43. An apparatus for wireless communication at a base station, comprising:
a processor;
memory coupled with the processor; and
instructions stored in the memory and operable, when executed by the processor, to cause the apparatus to:
identify a plurality of indices for a plurality of physical uplink control channel (PUCCH) resources, each index of the plurality of indices associated with a respective PUCCH resource that has a corresponding starting symbol and duration;
identify a PUCCH resource mapping rule based at least in part on an amount of uplink control information for a PUCCH transmission from a user equipment (UE);
determine, from among the plurality of PUCCH resources, a PUCCH resource for the PUCCH transmission based at least in part on using the PUCCH resource mapping rule to identify a corresponding index of the plurality of indices; and
receive the PUCCH transmission via the PUCCH resource.

44. The apparatus of claim 43, wherein, to identify the PUCCH resource mapping rule, the instructions are operable, when executed by the processor, to cause the apparatus to:
identify a first set of PUCCH resources from among the plurality of PUCCH resources based at least in part on the amount of uplink control information being less than or equal to a threshold amount; and
identify a first resource mapping rule based at least in part on a number of PUCCH resources included in the first set being above a threshold number of PUCCH resources.

45. The apparatus of claim 44, wherein, to identify the PUCCH resource mapping rule, the instructions are further operable, when executed by the processor, to cause the apparatus to:
identify a second resource mapping rule different than the first resource mapping rule based at least in part on the number of PUCCH resources included in the first set being less than or equal to the threshold number of PUCCH resources.

46. An apparatus for wireless communication at a user equipment (UE), comprising:
a processor;
memory coupled with the processor; and
instructions stored in the memory and operable, when executed by the processor, to cause the apparatus to:
identify a plurality of indices for a plurality of physical uplink control channel (PUCCH) resources, each index of the plurality of indices associated with a respective PUCCH resource that has a corresponding starting symbol and duration;

identify a PUCCH resource mapping rule based at least in part on an amount of uplink control information for a PUCCH transmission;

determine, from among the plurality of PUCCH resources, a PUCCH resource for the PUCCH transmission based at least in part on using the PUCCH resource mapping rule to identify a corresponding index of the plurality of indices; and transmit the PUCCH transmission via the PUCCH resource.

47. The apparatus of claim 46, wherein, to identify the PUCCH resource mapping rule, the instructions are operable, when executed by the processor, to cause the apparatus to:

identify a first set of PUCCH resources from among the plurality of PUCCH resources based at least in part on the amount of uplink control information being less than or equal to a threshold amount; and identify a first resource mapping rule based at least in part on a number of PUCCH resources included in the first set being above a threshold number of PUCCH resources.

48. The apparatus of claim 47, wherein, to identify the PUCCH resource mapping rule, the instructions are further operable, when executed by the processor, to cause the apparatus to:

identify a second resource mapping rule different than the first resource mapping rule based at least in part on the number of PUCCH resources included in the first set being less than or equal to the threshold number of PUCCH resources.

49. A non-transitory computer readable medium storing code for wireless communication at a base station, the code comprising instructions executable by a processor to:

identify a plurality of indices for a plurality of physical uplink control channel (PUCCH) resources, each index of the plurality of indices associated with a respective PUCCH resource that has a corresponding starting symbol and duration;

identify a PUCCH resource mapping rule based at least in part on an amount of uplink control information for a PUCCH transmission from a user equipment (UE);

determine, from among the plurality of PUCCH resources, a PUCCH resource for the PUCCH transmission based at least in part on using the PUCCH resource mapping rule to identify a corresponding index of the plurality of indices; and transmit the PUCCH transmission via the PUCCH resource.

50. A non-transitory computer readable medium storing code for wireless communication at a user equipment (UE), the code comprising instructions executable by a processor to:

identify a plurality of indices for a plurality of physical uplink control channel (PUCCH) resources, each index of the plurality of indices associated with a respective PUCCH resource that has a corresponding starting symbol and duration;

identify a PUCCH resource mapping rule based at least in part on an amount of uplink control information for a PUCCH transmission;

determine, from among the plurality of PUCCH resources, a PUCCH resource for the PUCCH transmission based at least in part on using the PUCCH resource mapping rule to identify a corresponding index of the plurality of indices; and transmit the PUCCH transmission via the PUCCH resource.

* * * * *